United States Patent [19]
Long, Jr.

[11] Patent Number: 4,630,676
[45] Date of Patent: Dec. 23, 1986

[54] REMOTELY CONTROLLED HYDRAULIC CUTTER APPARATUS

[75] Inventor: Charles A. Long, Jr., Birmingham, Ala.

[73] Assignee: Long Technologies, Inc., Birmingham, Ala.

[21] Appl. No.: 564,983

[22] Filed: Dec. 23, 1983

[51] Int. Cl.$^4$ ............................................... E03F 3/06
[52] U.S. Cl. ....................................... 166/55; 175/77; 175/78; 409/143; 409/190
[58] Field of Search ................. 166/55, 55.2, 50, 55.7, 166/55.8; 175/78, 77; 409/143, 190

[56] References Cited

U.S. PATENT DOCUMENTS

| | | | |
|---|---|---|---|
| 602,301 | 4/1898 | Bramlette | 166/55.3 |
| 2,178,554 | 11/1939 | Bowie | 175/90 |
| 2,198,821 | 4/1940 | Jessup | 166/100 |
| 2,326,827 | 8/1943 | Bynum | 175/77 |
| 2,327,023 | 8/1943 | Danner | 175/78 |
| 2,345,766 | 4/1944 | Miller | 175/256 |
| 2,354,399 | 7/1944 | Noble | 175/248 |
| 2,622,327 | 12/1952 | Halonen | 33/21 C |
| 2,697,585 | 12/1954 | Chaney | 175/77 |
| 2,971,259 | 2/1961 | Hahnau et al. | 33/1 |
| 3,175,392 | 3/1965 | Tharalson et al. | 73/84 |
| 3,464,313 | 9/1969 | Shay et al. | 90/12 |
| 3,587,194 | 6/1971 | Brown | 166/55 X |
| 4,009,063 | 2/1977 | Wood | 156/71 |
| 4,064,211 | 12/1977 | Wood | 264/95 |
| 4,135,958 | 1/1979 | Wood | 156/199 |
| 4,197,908 | 4/1980 | Davis et al. | 166/55 |
| 4,442,891 | 4/1984 | Wood | 166/55.2 |

FOREIGN PATENT DOCUMENTS 1154778 9/1963 Fed. Rep. of Germany ........ 166/55

*Primary Examiner*—James A. Leppink
*Assistant Examiner*—Hoang C. Dang
*Attorney, Agent, or Firm*—Panitch Schwarze Jacobs & Nadel

[57] ABSTRACT

A remotely controlled, hydraulically operated cutter apparatus for use within a conduit includes a control for generating a plurality of control signals for controlling the operation of a source of pressurized hydraulic fluid. Valves are provided for receiving both the pressurized fluid and the control signals and for distributing the received fluid in accordance with the received control signals. A hydraulically powered cutter motor located within the conduit and including a cutter tool receives the hydraulic fluid from the valves for driving the cutter tool. The cutter motor is supported within the conduit by supporting members. A first hydraulically actuated cylinder is included for receiving hydraulic fluid from the valves and for holding the supporting members in a fixed axial position within the conduit. Second, third and fourth hydraulically actuated cylinders are provided for adjusting the axial and radial position of the cutter motor and for rotating the cutter motor to position the cutter motor to facilitate cutting by the cutting tool.

10 Claims, 35 Drawing Figures

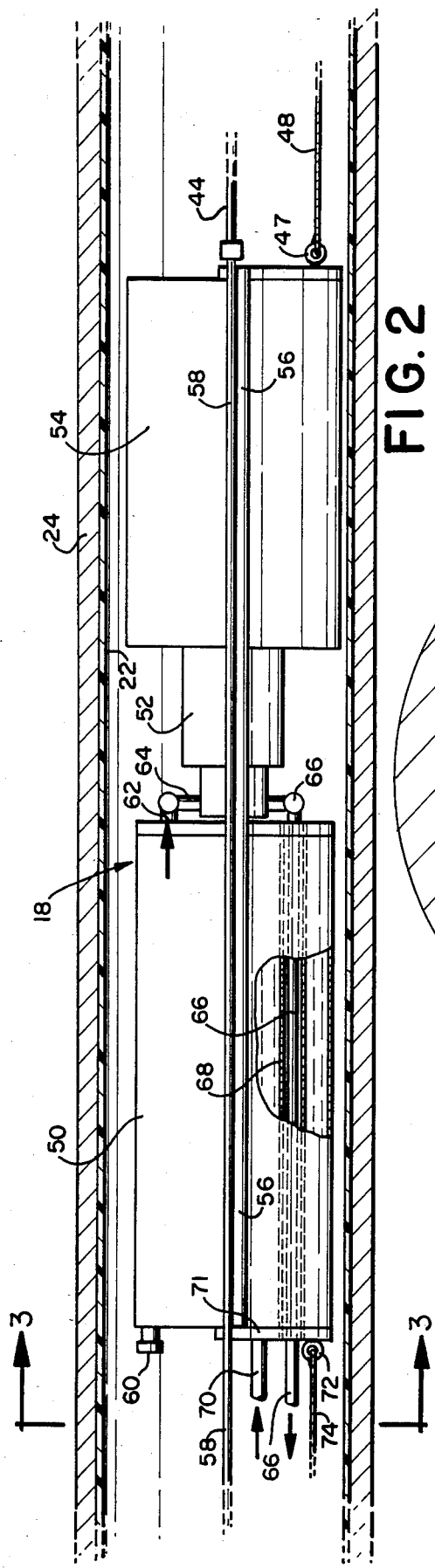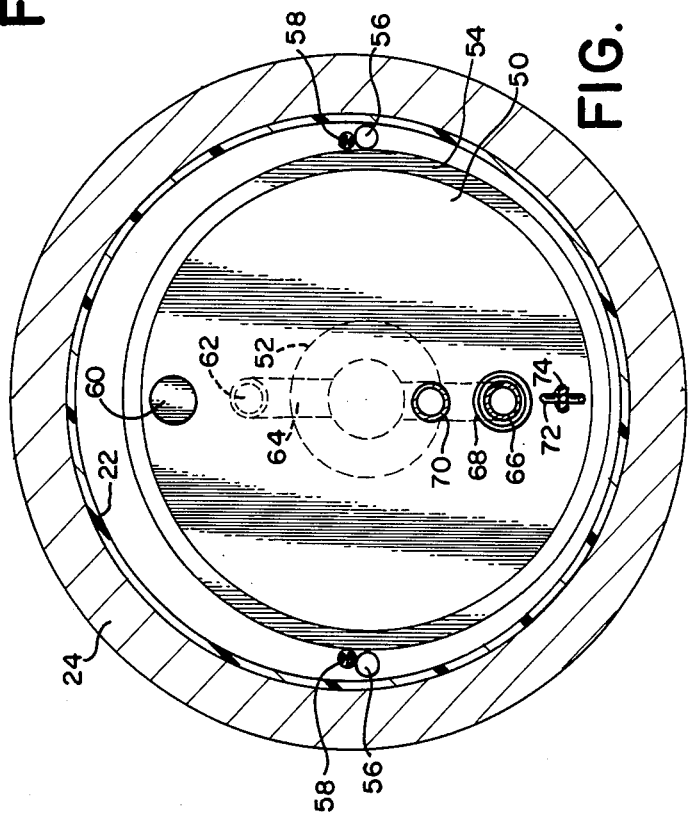

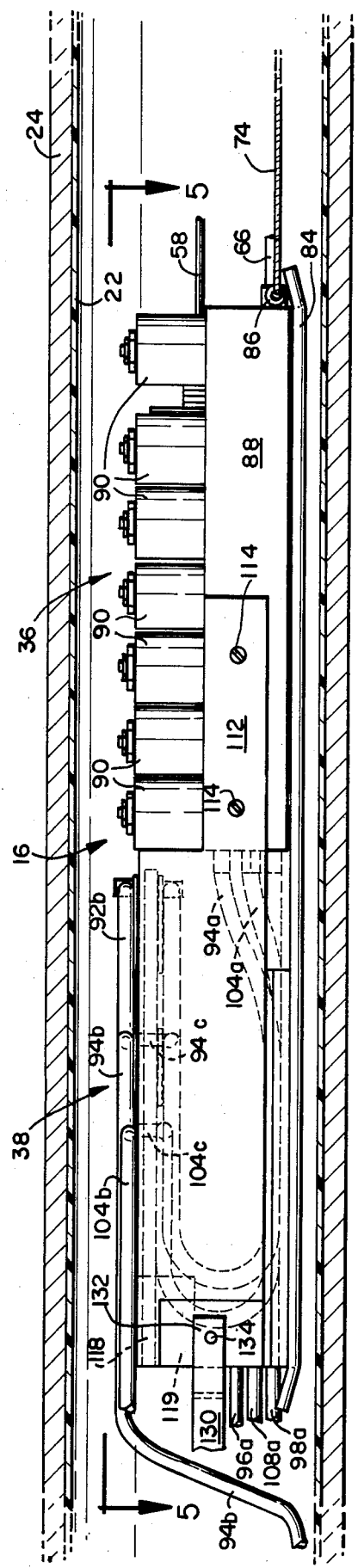
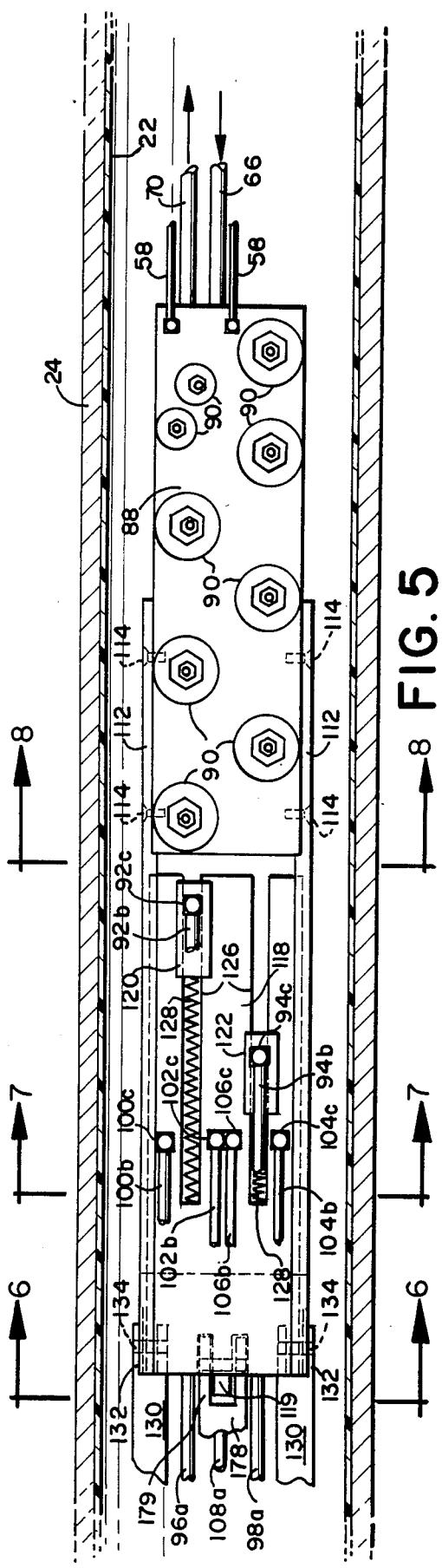

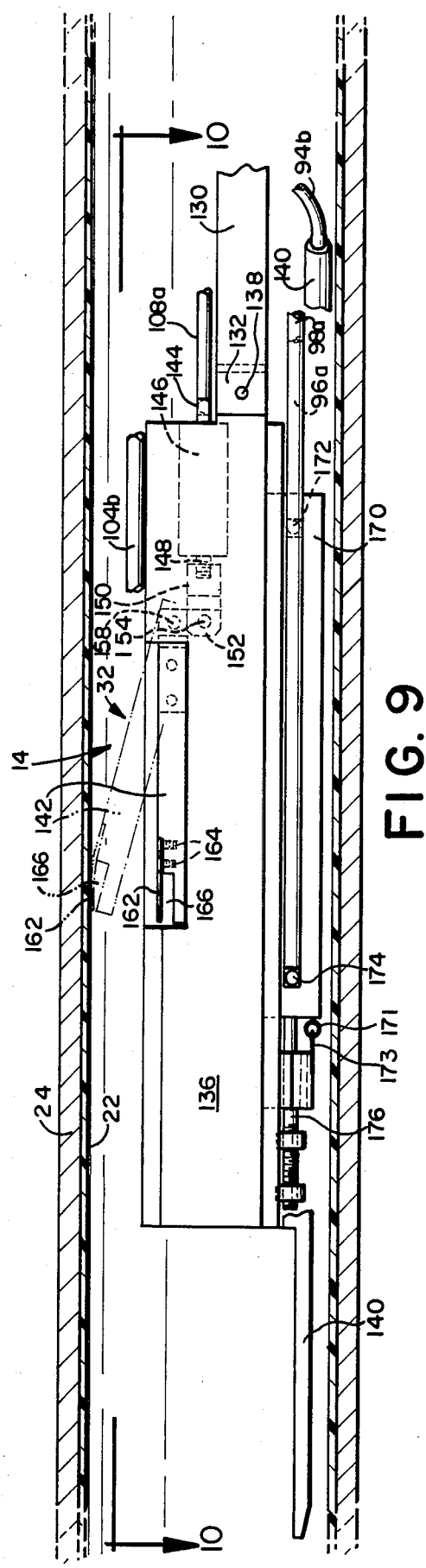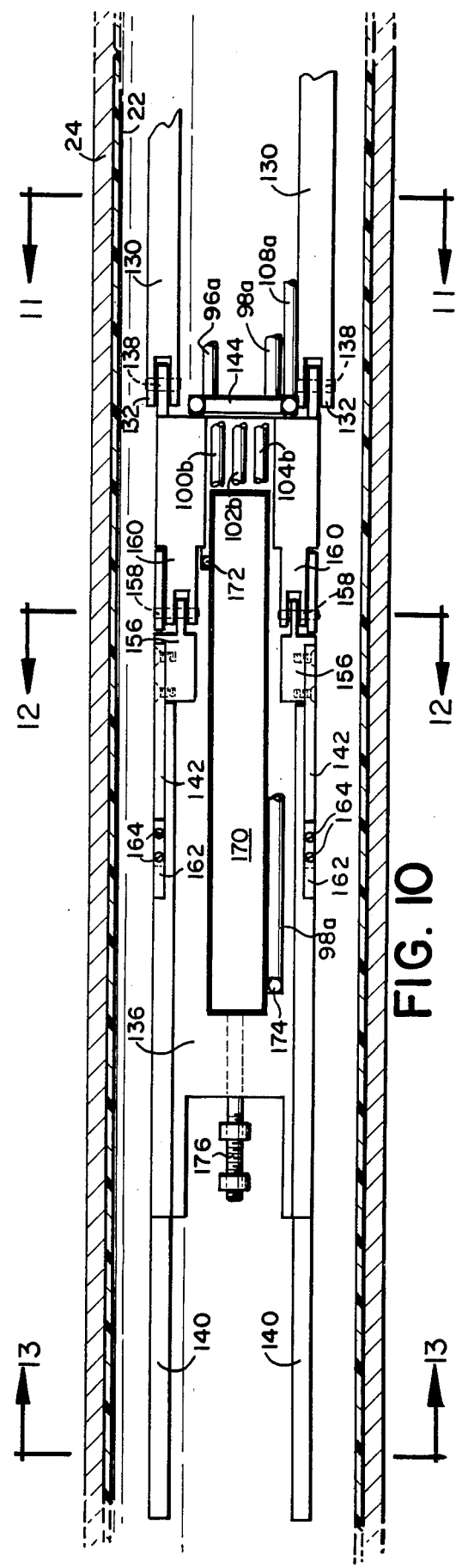

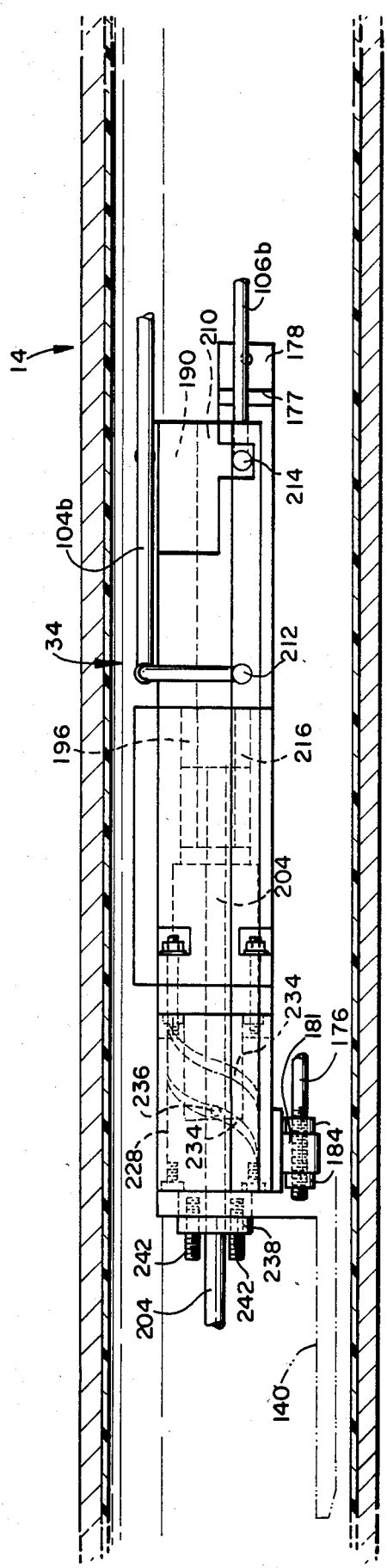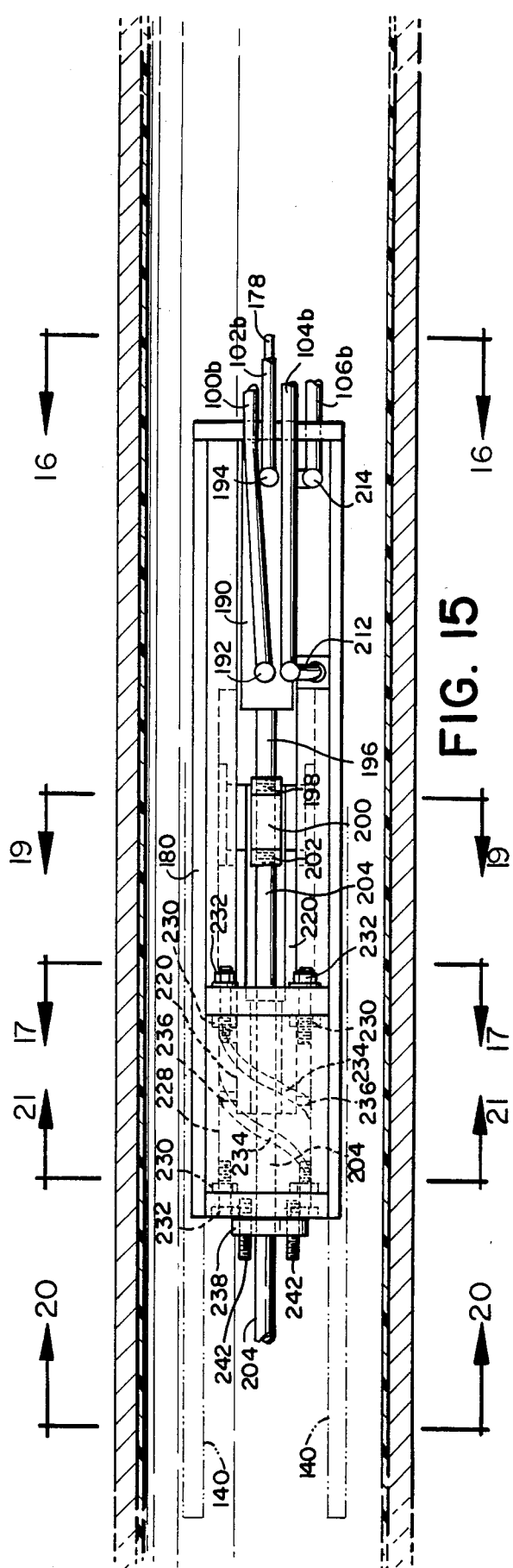

REMOTELY CONTROLLED HYDRAULIC CUTTER APPARATUS

BACKGROUND OF THE IVENTION

The present invention relates generally to a remotely controlled, hydraulically operated cutter apparatus and, more particularly, to such an apparatus for use within a conduit or pipe.

It is generally well known that conduits or pipes which are employed for conducting fluids, for example, sanitary sewer pipes, storm sewer pipes, water lines and gas lines, frequently require repair due to leakage. The leakage may be inwardly, from the environment into the pipe, or outwardly, from the pipe into the environment. Leakage of this type may be due to improper initial installation of the pipe, deterioration of the pipe itself due to aging or the effects of corrosive materials, cracking of the pipe or pipe joints due to environmental conditions such as earthquakes or similar natural or man made vibrations, or any other such causes. Regardless of the cause, such leakage is undesirable at best and may result in waste of the fluid, damage to the environment and the possible creation of public health hazards.

Because of ever increasing labor and machinery costs it is becoming increasingly more difficult, at least economically, to dig up and replace those pipes or portions of pipes which may be leaking. As a result, various methods have been devised for the in situ repair or rehabilitation of the existing pipes, thereby avoiding the expenses and hazards involved in digging up and replacing the pipes. One of the most successful such repair or rehabilitation processes which has been developed is called the Insituform process which is described in U.S. Pat. Nos. 4,009,063; 4,064,211; and 4,135,958 the contents of which are incorporated by reference herein.

Briefly, in the Insituform process, an elongated flexible tubular liner comprised of a felt or foam material which is impregnated with a thermal setting synthetic resin is installed within the existing pipe utilizing an inverting process as described in the aforesaid patents. Once the liner is in place within the pipe, the liner is pressurized from within, preferably utilizing a high temperature fluid, to force the liner radially outwardly to engage and conform to the interior surface of the pipe. The resin is then cured to form a relatively hard, tight fitting, rigid pipe lining which effectively seals any cracks and repairs any pipe or joint deterioration to prevent further leakage either into or out of the pipe.

When such a liner is installed within a pipe, such as a sanitary sewer main, which includes a plurality of connecting service entrances, such as smaller laterals which carry sewage from individual sources into the main pipe, all of the service entrances or laterals are effectively covered over and sealed by the liner. It therefore becomes necessary to either gain access to the junctures of the laterals with the main sewer pipe in order to cut holes through the liners or to provide a remotely controlled cutter to cut out the portion of the liner that covers over the service or lateral entrances.

The prior art cutter which has been previously employed for this purpose is described in U.S. Pat. No. 4,197,908. While the prior art cutter described in this patent is generally effective in cutting the liner as required to port or open the various service entrances or laterals to the main sewer pipe, the prior art cutter is relatively expensive to manufacture and to operate. In addition, the prior art cutter is unreliable primarily because it is basically electrically powered and controlled and the moisture laden sewer pipe environment frequently causes the prior art cutter to fail due to electrical short circuits and the like.

The present invention provides a remotely controlled cutter apparatus which is hydraulically operated and controlled to provide more economical, efficient and reliable service.

SUMMARY OF THE INVENTION

Briefly stated, the present invention comprises a remotely controlled, hydraulically operated cutter apparatus for use within a conduit, such as a sewer pipe. The apparatus comprises control means located outside of the conduit for generating a plurality of control signals for controlling the operation of the cutter apparatus and a source of pressurized hydraulic fluid. Valve means are provided for receiving both the pressurized hydraulic fluid and the control signals and for distributing the received hydraulic fluid in accordance with the received control signals. A hydraulically powered cutter motor is located within the conduit and includes a cutting tool. The cutter motor receives hydraulic fluid from the valve means for driving the cutting tool. Means are provided for supporting the cutter motor within the conduit. First hydraulically actuated means are included for receiving hydraulic fluid from the valve means and for holding the supporting means at a fixed axial position within the conduit as long as the received hydraulic fluid exceeds a predetermined minimum. Second hydraulically actuated means are provided for receiving hydraulic fluid from the valve means and for adjusting the axial position of the cutter motor with respect to the supporting means in accordance with the received hydraulic fluid. Third hydraulically actuated means are also included for receiving hydraulic fluid from the valve means and for adjusting the radial position of the cutter motor with respect to the supporting means in accordance with the received hydraulic fluid. Fourth hydraulically actuated means are also provided for receiving hydraulic fluid from the valve means and for rotating the cutter motor up to 180 degrees about the axis of the conduit in either a clockwise or counterclockwise direction with respect to an initial position in accordance with the received hydraulic fluid. The first, second, third and fourth hydraulically actuated means cooperate to position the cutter motor to facilitate cutting by the cutting tool.

BRIEF DESCRIPTION OF THE DRAWINGS

The foregoing summary, as well as the following detailed description will be better understood when read in conjunction with the appended drawings. For the purpose of illustrating the invention, there is shown in the drawings an embodiment which is presently preferred, it being understood, however, that this invention is not limited to the precise arrangement and instrumentalities shown. In the drawing:

FIG. 2 is an enlarged elevation view, partially broken away, of the hydraulic fluid reservoir and hydraulic pump portion of the apparatus of FIG. 1;

FIG. 3 is a sectional view of a portion of the apparatus taken along line 3—3 of FIG. 2;

FIG. 4 is an enlarged elevation view of the valve means portion of the apparatus of FIG. 1;

FIG. 5 is a sectional view of a portion of the apparatus taken along line 5—5 of FIG. 4;

FIG. 9 is an enlarged elevation view, partially broken away, of the supporting means portion of the apparatus of FIG. 1;

FIG. 10 is a sectional view of a portion of the apparatus taken along line 10—10 of FIG. 9;

FIG. 14 is an enlarged elevation view of the cutter position adjusting means portion of the apparatus of FIG. 1;

FIG. 15 is a plan view of the portion of the apparatus shown in FIG. 14;

DESCRIPTION OF A PREFERRED EMBODIMENT

Figure 1:
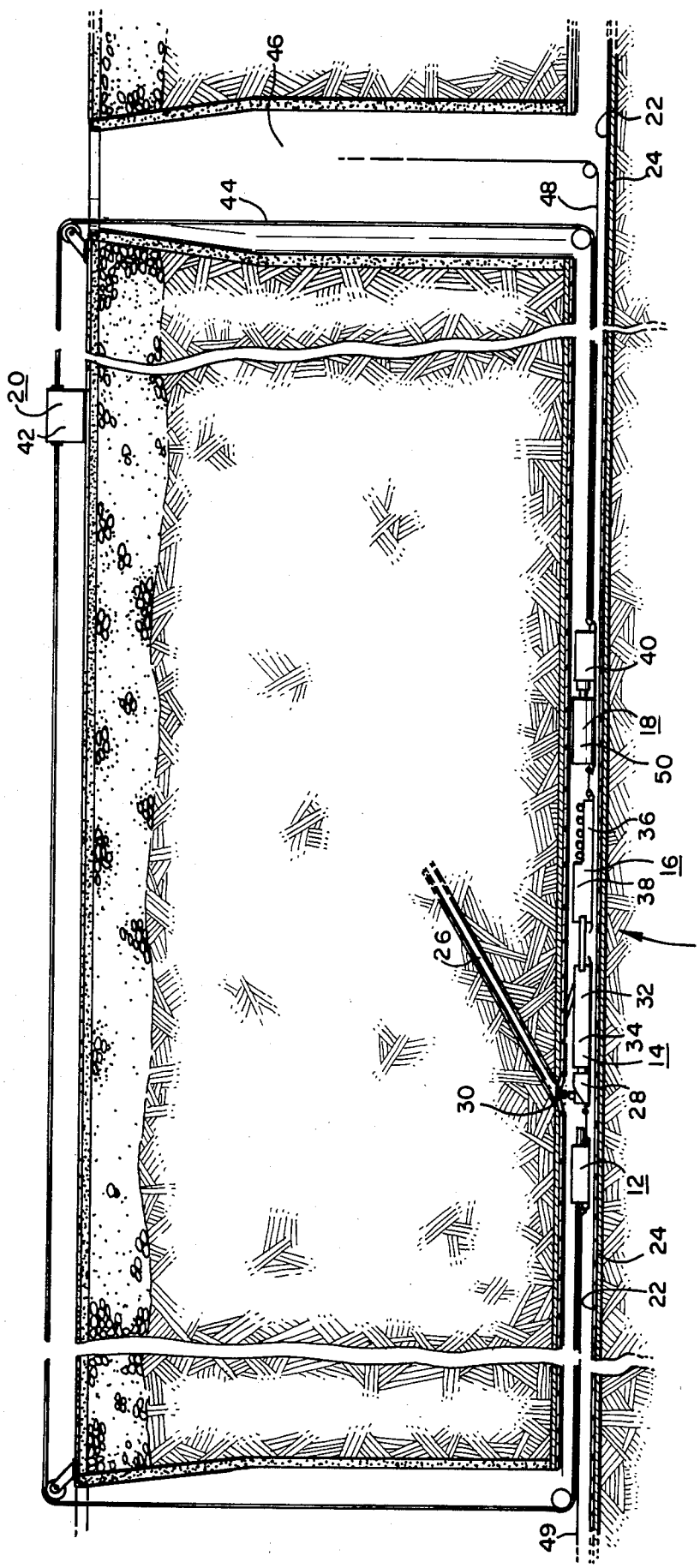
FIG. 1 is a front elevation view of the preferred embodiment of the cutter apparatus of the present invention installed within a subterranean sewer pipe.

Referring to FIG. 1, there is shown a schematic block diagram representation of a remotely controlled hydraulically operated cutter apparatus indicated generally as 10. The cutter apparatus 10 of the present invention comprises five individual structural units or assemblies 12, 14, 16, 18 and 20, four of which (12, 14, 16 and 18) are sequentially coupled or attached together for concurrent movement along a single line as shown. Each such structural unit may include one or more functional subassemblies of the cutter apparatus 10 as will hereinafter be described.

In the presently preferred embodiment, the cutter apparatus 10 is shown and described as being employed for the purpose of locating and cutting through a portion of a liner, preferably an insituformed thermosetting plastic liner 22 which has previously been installed within a conduit or pipe, for example, an underground or otherwise inaccessible conduit, in the present embodiment sewer pipe 24. As discussed above, the cutter apparatus 10 is employed for locating and cutting through a portion of the sewer pipe liner 22 which may be blocking or partially blocking the entrance to connecting service pipe or lateral 26 and thereby preventing the free flow of sewage from the lateral 26 therethrough. The cutter apparatus 10 is particularly useful in connection with sewer pipes or the like having a relatively small diameter, on the order of 7 ½ inches inside diameter, which is insufficient to permit the cutting of the liner 22 in any other conventional manner without having to dig up the sewer pipe 24. Due to the relatively small size of the sewer pipe 24 the outside dimensions of the various structural units is critical. Each unit must not exceed 6⅝ inches in diameter in order to provide sufficient clearance for movement along the sewer pipe 24.

The first structural unit 12 is located at the front end (left side when viewing FIG. 1) of the cutter apparatus 10 and contains a video or television camera and audio subassembly. The video camera subassembly is employed to initially determine the location of a lateral 26 which is blocked by the sewer pipe liner 22. Thereafter, the video camera and the audio may be utilized to serve as the "eyes" and "ears" of the operator to monitor the cutting of the portion of the liner 22 which is blocking the lateral 26.

The video camera subassembly is substantially the same as the type employed in the prior art for substantially the same purpose. Units of this type are well known and are generally commercially available. More specific details of the structure and operational features of the video camera subassembly and the first structural unit 12 are not believed to be necessary for a complete understanding of the present invention and, therefore, will not be presented herein.

The second structural unit 14 includes three functional subassemblies which are coupled together in a single structural unit as shown. The forward (left most when viewing FIG. 1) portion of the unit 14 contains the cutter subassembly 28 which includes a cutter 30 which is employed to do the actual cutting of the liner 22.

The other portion of the second unit includes both a holder subassembly 32 and a cutter position adjusting subassembly 34. As the name implies, the holder subassembly 32 is employed to support the cutter 30 and hold or secure the four operational units of the cutter apparatus 10 in a fixed axial position within the sewer pipe 24 during the liner cutting operation. For this purpose, the holder subassembly 32 includes first hydraulically actuated means for receiving pressurized hydraulic fluid and for holding the units at a fixed axial position within the sewer pipe as long as the received fluid exceeds a predetermined minimum. Correspondingly, the cutter position adjusting subassembly 34 is employed in conjunction with the cutter subassembly 28 to move the cutter 30 as required to permit the cutting of the liner 22 around the entire area of the connecting lateral 26. In the present embodiment, the cutter position adjusting subassembly 34 includes second hydraulically actuated means for receiving pressurized hydraulic fluid and for adjusting the axial position of the cutter 30 forward and rearward within the pipe 24 (toward the left and right respectively when viewing FIG. 1) and fourth hydraulically actuated means for receiving pressurized hydraulic fluid and for rotating the cutter 30 as much as 180 degrees either clockwise or counter-clockwise from its starting or storage position (twelve o'clock position when looking along the axis of the sewer pipe 24) to permit the cutting of the liner 22 at various positions around the circumference of the sewer pipe 24. As will hereinafter become apparent, the cutter position adjusting subassembly 34 also includes third hydraulically actuated means for receiving hydraulic fluid and for cooperating with the cutter subassembly 28 for adjusting the radial position of the cutter 30.

The third basic structural unit 16 includes a valve means or hydraulic valve subassembly 36 and a hydraulic hose control subassembly 38. The hydraulic valve subassembly 36 receives hydraulic fluid under pressure and directs or distributes the hydraulic fluid in accordance with received control signals through a plurality of conduits or hydraulic hoses for the actuation of the cutter subassembly 28, the cutter position adjusting subassembly 34 and the holder subassembly 32. The hose control subassembly 38 controls the movement of the various hydraulic hoses during the cutting operation to insure that the length of the hydraulic hoses is sufficient to compensate for the movements of the cutter 30 and that the various hoses do not become entangled as a result of the movement of the cutter 30.

The fourth basic structural unit 18 comprises a source of pressurized fluid, preferably hydraulic fluid which includes a hydraulic fluid pump subassembly 40 having a hydraulic pump and a hydraulic fluid reservoir. As its name implies, the hydraulic fluid pump subassembly 40 serves to provide a supply of hydraulic fluid under pressure to the valve means or hydraulic valve subassembly 36 for subsequent distribution and use in the actuation and positioning of the cutter 30.

The previously described first four structural units 12, 14, 16 and 18 are the operational units which are installed within the sewer pipe 24 to accomplish the actual cutting of the liner 22. The fifth basic structural unit 20 which is physically located outside of the sewer pipe, preferably on the surface as shown, is the control means or control subassembly 42. The control subassembly 42 is connected to the four operational units 12, 14, 16 and 18 by a suitable connecting means such as a multiple conductor electrical cable 44. The control subassembly 42 generates a plurality of control signals, preferably electrical signals to provide a means for an operator to control the entire underground cutting operation from the surface. The control subassembly 42 also receives the signals from the video and audio subassembly to assist the operator in controlling the in ground cutting operation.

In the operation of the cutter apparatus 10 the various operational units 12, 14, 16 and 18 are initially installed within the sewer pipe 24 by way of a conventional manhole 46 typically four feet in inside diameter. The operational units 12, 14, 16 and 18 are attached together end to end for cooperative movement along the sewer pipe using flexible or bendable attachment means, as will hereinafter be described, to give the apparatus 10 sufficient flexibility to permit the various units to be manipulated around the sharp corner formed by the intersection of the manhole 46 and the sewer pipe 24 and around any sharp bends within the sewer pipe 24. The front (left) end of the first unit 12 includes suitable attachment means such as an eye bolt for attaching a suitable movement means such as a steel cable 49 for pulling the operational units 12, 14, 16 and 18 forward (toward the left) along the sewer pipe 24. Correspondingly, the rear (right) end of unit 18 includes a similar suitable attachment means pull ring 47 for attaching a similar movement means such as steel cable 48 to permit the apparatus 10 to be pulled along the sewer pipe 24 in the other (reverse) direction. The cables 48 and 49 may be manually pulled by an operator or they may be attached to suitable mechanical winch means (not shown) which may be motor driven. The winch means (not shown) may be located within the sewer pipe 24 or on the surface.

Once the operational units 12, 14, 16 and 18 of the cutter apparatus 10 are installed within the sewer pipe 24 the video camera is activated to survey or scan the interior surface of the sewer pipe liner 22 to provide a visual display for the operator. The operational units are then pulled forward by cable 49 along the sewer pipe 24 toward the left when viewing FIG. 1. The video camera in the first unit 12 continues to scan the interior of the sewer pipe liner 22 as the operational units move toward the left.

The apparatus 10 continues to move along the sewer pipe 24 until the the presence of a lateral 26 is detected. The presence of a lateral is easy to detect because when the thermosetting plastic liner 22 is installed within the sewer pipe 24 a depression or dimple which is readily apparent to the operator from the video display is formed over the lateral opening due to the lack of support for the liner 22 during the curing process. The presence of a generally circular dimple having a diameter which approximates that of a lateral within the liner 22 indicates the presence of a connecting lateral 26 which must be opened to permit the free flow of sewage from the lateral 26 into the sewer pipe 24.

Once such a dimple is located, the operational units 12, 14, 16 and 18 are pulled to a position in which the cutter 30 within unit 14 is approximately two inches away (toward the right) from the leading edge of the dimple. The operational units are then locked in place within the sewer pipe by the holder subassembly 32 of unit 14. Thereafter, the cutter 30 is maneuvered into position for cutting through the dimple as shown. Manipulation of the cutter 30 may involve rotating the cutter 30 in either one direction or the other and/or moving the cutter 30 axially along the sewer pipe 24. In addition, the cutter 30 may be moved radially outwardly to bring the actual cutting head into engagement with the liner dimple. Movement of the cutter 30 is controlled by the operator who continuously observes the position of the cutter on the visual display. In addition, the audio from the cutter 30 is provided to the operator to help monitor the cutting operation.

Initially, a small hole is cut through the dimpled portion of the liner 22. In addition to confirming to the operator that the dimple does in fact indicate the presence of a lateral 26, the small hole permits any fluid or other material which has been trapped and has accumulated within the lateral 26 to drain into the sewer pipe 24. Once the drainage of the lateral 26 has been completed, the remainder of the dimpled portion of the liner 22 is cut away by the operator manipulating the cutter 30 so that it moves completely around the lateral 26 to thereby remove the liner 22 around the entire inner surface of the lateral 26. Again, the operator can observe the progress of the cutter 30 on the visual display and can hear the cutting as it is accomplished.

Once the lateral 26 is completely opened to the sewer pipe 24 the cutter 30 is moved radially inwardly and is returned to its starting or storage position, the holder subassembly 32 is disengaged from the sewer pipe 24 and the operational units 12, 14, 16 and 18 are pulled further along the sewer pipe 24 until another depression or dimple is located. The cutting operation is repeated along the entire length of the sewer pipe 24 until the liner 22 is cut away from all of the laterals 26 along the sewer pipe.

The foregoing general discussion was included to provide a basic understanding of the structure and operation of the cutter apparatus 10. It is believed that this basic understanding will facilitate a better understanding of the more detailed discussion of the structural and operational features of each of the various subassemblies of the cutter apparatus 10 which will hereinafter be provided. In order to further clarify the detailed description of the various subassemblies, each structural unit will be separately described starting with the fourth (rearmost or rightmost) structural unit 18.

Hydraulic Pump Subassembly

Referring now to FIGS. 2 and 3, there is shown in greater detail the structural features of the pressurized hydraulic fluid source or hydraulic fluid pump subassembly 40 of structural unit 18 which includes both a hydraulic fluid reservoir 50 and a hydraulic pump 52. Both the hydraulic fluid reservoir 50 and the hydraulic pump 52 are generally cylindrical and are sized to fit within the sewer pipe 24 as shown with sufficient clearance to permit axial movement therein.

In the present embodiment, the hydraulic pump 52 is a standard, commercially available model which is driven by a conventional two-horsepower, 110 volt, DC electric motor 54. The electric motor 54 of the present embodiment is commercially available from the Stanley Company and is heavily insulated and explosion proof to permit safe operation in the sometimes moisture laden, gas filled environment present within a sewer pipe 24. The electric motor 54 is drivingly coupled to the hydraulic pump 52 in any suitable, known manner.

A detailed description of the structure and/or operation of the hydraulic pump 52 and the electric motor 54 is not necessary for a complete understanding of the present invention and therefore will not be presented. Such information may be obtained from the various manufacturers which produce and sell such pumps and motors. Suffice it to say that upon the application of electrical current, the armature of the electric motor 54 is driven to rotate in the usual manner thereby similarly driving an attached, rotatable impeller or the like within the pump 52. The rotation of the pump impeller pressurizes and propels the hydraulic fluid as will hereinafter be described to provide the required hydraulic power.

The hydraulic fluid reservoir 50, hydraulic pump 52 and electric motor 54 are connected together end to end along a common axis. Both the hydraulic fluid reservoir 50 and the electric motor 54 are held together and commonly supported by a pair of steel guide rails 56. The guide rails 56, which in the present embodiment are generally cylindrical, are suitably attached, for example by welding, to the sides of the motor 54 and to the reservoir 50 as shown and serve as means to support and hold together these two components at a predetermined distance within the sewer pipe 24 and to permit the convenient simultaneous axial movement of these components along the sewer pipe.

As shown, the multiple conductor electrical control cable 44 from the control subassembly 42 is split proximate the rear (right) end of the motor 54 into two smaller electrical control cables 58. The electrical control cables 58, each having a plurality of an electrical conductors therein, extend along the sides of the electric motor 54 and the reservoir 50 proximate the guide rails 56 as shown. Two of the electrical conductors are connected to the motor 54 (not shown) to provide power for the operation thereof. The cables 58 are also employed for conducting electrical control signals to the hydraulic valve subassembly for directing the flow of the pressurized hydraulic fluid for the operation of the cutter 30 as will hereinafter be described in greater detail.

The hydraulic fluid reservoir 50 is generally cylindrical in shape and contains a quantity of hydraulic fluid (not shown) sufficient to hydraulically control the position of the cutter 30 and to drive the cutter 30 as will hereinafter be described in greater detail. Hydraulic fluid is installed into the fluid reservoir 50 in the usual manner through a conveniently located fill pipe 60 which is thereafter suitably covered and sealed. The level of the fluid within the reservoir 50 should be periodically checked and the reservoir 50 should be refilled if necessary prior to installation within a sewer pipe 24.

The fluid reservoir 50 includes a fluid output port 62 which is connected by a suitable fluid conduit or hydraulic fluid hose 64 to the fluid intake side of the hydraulic pump 52. The fluid output side of the hydraulic pump 52 from which the pressurized fluid emerges is connected to another fluid conduit or hydraulic fluid hose 66 which extends forward (toward the left when viewing FIG. 2) through the fluid reservoir 50 for providing a continuous supply of hydraulic fluid under pressure to the valve means or hydraulic valve subassembly 36 (not shown in FIG. 2). A suitable protective sleeve 68 surrounds the conduit 66 within the reservoir 50 to prevent the inadvertent leakage of pressurized hydraulic fluid. A fluid return conduit 70 is provided to return hydraulic fluid to the fluid reservoir 50 through a fluid return port 71 as shown.

The fluid conduits or hoses which are employed in the present embodiment are flexible and lightweight but yet are strong enough to accommodate and conduct high pressure hydraulic fluid for extended periods of time. Such hoses are generally fabricated of synthetic rubber with fabric braid reinforcement and may be commercially purchased.

At the forward or left end of the fluid reservoir 50 there is provided an attaching means such as a pull ring or eye bolt 72 to which is attached a suitable connecting means such as cable 74 for connecting the fluid reservoir 50 to the rear end of the next forward unit 16 (not shown in FIG. 2). By connecting the units together in this manner, it is easier to bend the various units of the apparatus 10 around curves and corners for installation and movement within the small diameter sewer pipe 24.

Operation of the hydraulic fluid pump subassembly 40 is relatively straight forward. When electrical power is received by the electric motor 54 it is activated to turn the impeller of the hydraulic pump 52 in the usual known manner. The hydraulic pump 52 draws hydraulic fluid from the reservoir 50 and pumps the hydraulic fluid under pressure through the output conduit 66 for various uses as will hereinafter be described in greater detail. After the pressurized fluid has been utilized, it is returned for reuse to the fluid reservoir through the return conduit 70 and return port 71.

Hydraulic Fluid Control and Hydraulic Hose Control Subassemblies

Referring now to FIGS. 4 through 8 there is shown in greater detail the next forward unit 16 which includes the valve means or hydraulic valve subassembly generally designated 36 and the hydraulic hose control subassembly generally designated 38. The primary purpose of unit 16 is to receive the pressurized hydraulic fluid from the previously described unit 18 and to direct or distribute portions of the pressurized fluid in accordance with control signals received from the control subassembly 42 through a plurality of conduits or hydraulic hoses to vary the position of the cutter 30 and to provide hydraulic power to the cutter 30. As will hereinafter become apparent, the hose control subassembly 38 includes means which facilitates the movement and positioning of the cutter 30 without unduly entangling the various hydraulic hoses.

Referring now to FIGS. 4 and 5 it can be seen that the unit 16 is mounted upon a pair of generally cylindrical supporting skids. In the present embodiment, the supporting skids comprise steel guide rails 84 which facilitate movement of the unit along the sewer pipe 24. The steel rails 84 may be welded or otherwise attached to the bottom or underside of the unit 16 as shown. The rear (rightmost when viewing FIG. 4) end of the hydraulic valve subassembly 36 includes a suitable attaching means, such as an eye bolt 86 to which is attached the cable 74 for connection to the front end of the hydraulic reservoir 50. The distance between the rear end of the hydraulic valve subassembly 36 and the front end of the hydraulic reservoir 50 need not be constant.

The hydraulic valve subassembly 36 comprises a manifold means or manifold component having a housing 88 and a plurality of valves in the present embodiment, a plurality of electrically operated solenoid valves 90. Both the pressurized fluid conduit 66 and the fluid return conduit 70 are connected to suitable ports (not shown) within the manifold housing 88. The manifold housing 88 contains a plurality of internal connecting conduits (not shown) which can be interconnected by the various solenoid valves 90 to direct the received pressurized hydraulic fluid through a plurality of conduits or hoses for the performance of various functions as later described. Likewise, the manifold housing 88 functions to similarly direct return hydraulic fluid from a plurality of conduits or hoses to the return conduit 70 in accordance with the position of the various solenoid valves 90.

The two electrical cables 58 are connected to the manifold housing 88 as shown. Suitable conductors (not shown) within the manifold housing 88 connect the various conductors within the electrical cables 58 to the solenoid valves 90 for actuation thereof. Electrical signals from the control subassembly (not shown in FIGS. 4-8) are directed through the electrical cables 58 and the manifold conductors to control the position of each of the various solenoid valves 90 to cause hydraulic fluid to flow to or from various hydraulically actuated devices which will hereinafter be described.

Figure 8:
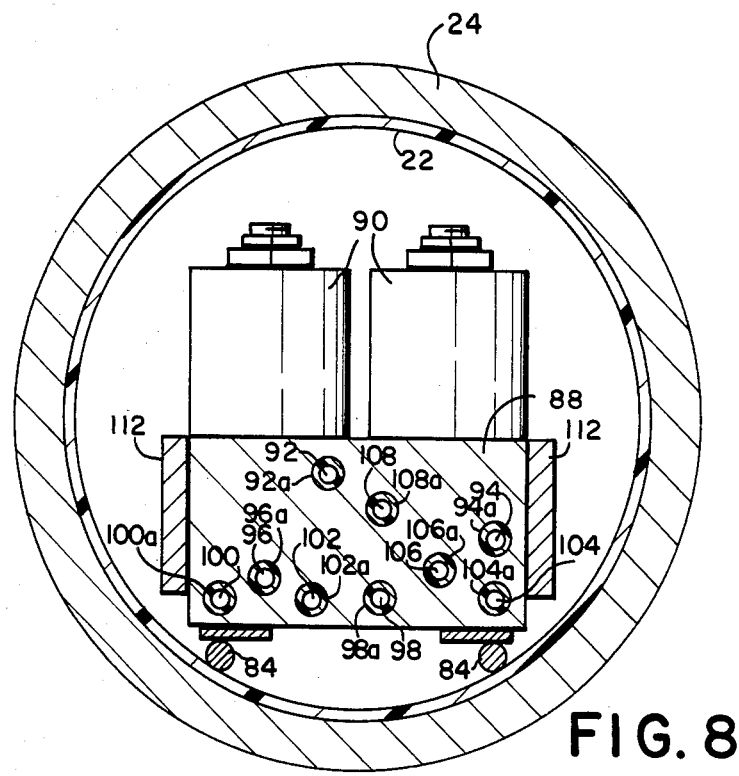
FIG. 8 is a sectional view of a portion of the apparatus taken along line 8—8 of FIG. 5.

FIG. 8 is a partial sectional view showing the various fluid transfer ports (input and output) ports within the forward end (left end when viewing FIG. 4) of the manifold housing 88 for transmitting and receiving fluid as will hereinafter become apparent. In the present embodiment, there are nine such transfer ports. The ports include a pressure port 92 and a return port 94 for the hydraulic fluid used to drive the cutter 30, a pair of ports 96 and 98 to provide a flow of hydraulic fluid to effectuate forward and rearward axial movement (left or right travel when viewing FIG. 1) of the cutter 30, a pair of ports 100 and 102 for providing a flow of hydraulic fluid to effectuate inward and outward radial movement (up and down when viewing FIG. 1) of the cutter 30, a pair of ports 104 and 106 for providing a flow of hydraulic fluid to effectuate 180 degree clockwise and counterclockwise rotation of the cutter 30 and a single pressure port 108 to provide a flow of hydraulic fluid to effectuate the securing or locking of the cutter apparatus 10 in place within the sewer pipe 24 as shown in FIG. 1. Additional details concerning the manner in which the various described hydraulic fluid flows are employed in conjunction with the first, second, third and fourth hydraulically actuated means and with the cutter motor to perform the various functions are set forth below.

Attached to each of the manifold housing transfer ports is a fluid conduit or hydraulic hose which is employed for the purpose of conducting the hydraulic fluid flowing through the port away from or toward the manifold housing 88. In the present embodiment, as best shown in FIGS. 4 and 8, the various hydraulic hoses are indicated as having the same reference numerals as the corresponding manifold ports but with the addition of the letter "a" thereto. Thus, for example, hydraulic hose 108a is connected to port 108 for conducting hydraulic fluid therefrom for the locking operation.

As indicated above, the hydraulic hoses employed in the present embodiment are small (approximately ½ inch in outside diameter) and lightweight and yet capable of withstanding the hydraulic pressure and conducting the hydraulic fluid without leakage over extended periods of time during which the cutting operation is being conducted within the sewer pipe 24. Hydraulic hoses of this type are primarily fabricated out of synthetic rubber with fabric braid reinforcement which provides the necessary strength and flexibility.

As discussed above, the cutter 30 must be capable of at least 12 inches of forward axial movement along the sewer pipe 24 to provide the needed capability of cutting through the liner 22 to opening connecting laterals having up to an 8 inch diameter and also allow the additional travel motion that is necessary to line up the cutter 30. To provide the capability of moving the cutter 30 such a distance, the various hydraulic hoses which are connected to the cutter and which are employed to actuate the cutter 30 must also be capable of moving the same distance. In addition, since the cutter 30 is also required to rotate as much as 180 degrees in either the clockwise or counterclockwise direction, at least some of the hydraulic hoses must be capable of additional movement to permit the free rotation of the cutter 30 without unduly straining any of the attached hydraulic hoses. The hydraulic hose control subassembly 38 includes means for maintaining the various hydraulic hoses in an untangled condition while permitting the hoses to move as required to accommodate and compensate for the various movements of the cutter 30 without undue wear or stress upon the hydraulic hoses.

Figure 6:
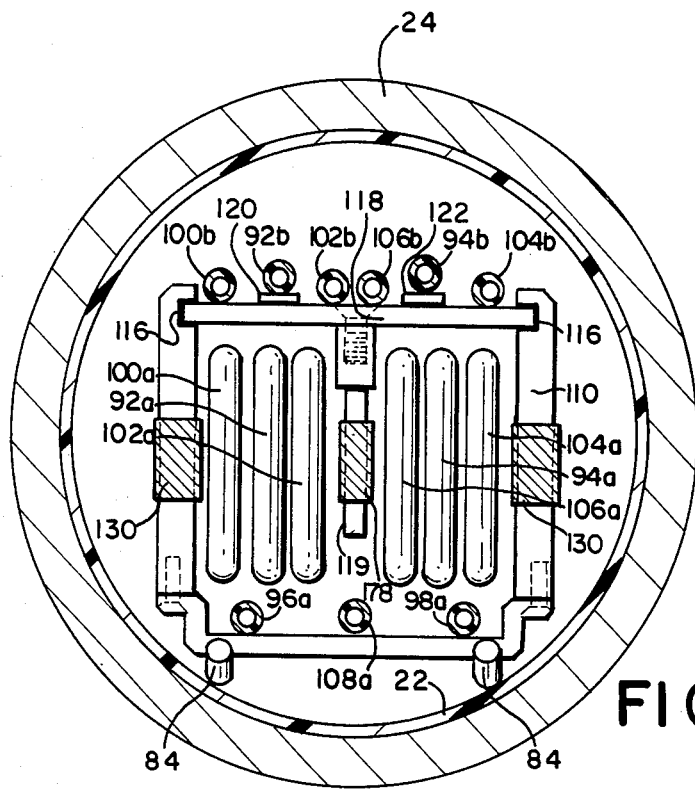
FIG. 6 is a sectional view of a portion of the apparatus taken along line 6—6 of FIG. 5.
Figure 7:
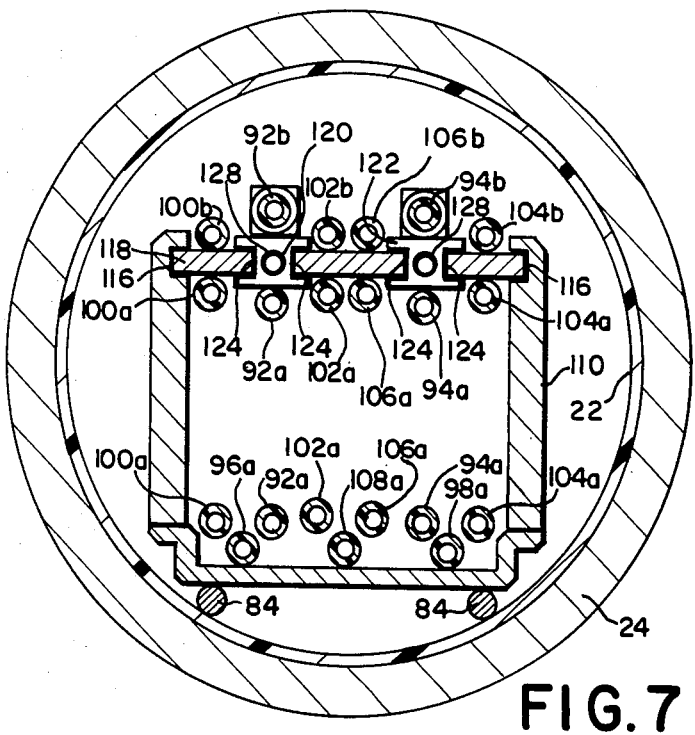
FIG. 7 is a sectional view of a portion of the apparatus taken along line 7—7 of FIG. 5.

The hydraulic hose control subassembly 38 includes an elongated housing 110 which, as shown in FIGS. 6 and 7 is generally U-shaped in cross section with an open top. The rearward end of each lateral side of the housing 110 includes a rearwardly extending connecting strut 112 which is employed for securing or attaching the hydraulic hose control housing 110 to the corresponding sides of the above-described manifold housing 88 utilizing suitable attachment means such as bolts or screws 114 as shown. The struts 112 and the skids 84 cooperate to maintain the hydraulic hose control housing 110 in a fixed position with respect to the manifold housing 88.

As shown in FIGS. 6 and 7, the hydraulic hose control housing 110 includes a pair of opposing elongated guide grooves 116 extending generally parallel to the axis of the sewer pipe 24 along the interior surface of each of the sides thereof. A flat generally rectangularly shaped hydraulic hose supporting slide member 118 is supported within the guide grooves 116 as shown in FIG. 6. The thickness and width of the slide member 118 are such that the slide member 118 is free to translate or slide axially (toward the left and right when viewing FIG. 5) within the grooves 116 (along the axis of the sewer pipe). For purposes which will hereinafter become apparent, the slide member 118 must be capable of sliding axially at least a distance of 12 inches from its full rearward to its full forward position.

As best seen in phantom in FIG. 4, hydraulic hoses 92a, 94a, 100a, 102a, 104a and 106a extend outwardly in the forward direction from the front or left end of the manifold housing 88 approximately the entire length of the housing 110 and thereafter are looped around a substantially 180 degree large radius bend to extend rearwardly toward the manifold housing 88. The distal ends of each of these six hydraulic hoses are each attached respectively to a first or lower end of six identical feed through fluid connectors 92c, 94c, 100c, 102c, 104c and 106c which extend downwardly from the under surface of the slide member 118. As shown, the six feed through fluid connectors extend upwardly through the slide member 118 to provide six individual conduits for the passage of hydraulic fluid therethrough. Attached to the second or upper end of each of the feed through fluid connectors are an equal plurality of hydraulic hoses designated 92b, 94b, 100b, 102b, 104b, and 106b respectively. The feed through connectors thus serve as a means for passing hydraulic fluid from the six specific hydraulic hoses positioned beneath the slide member 118 (i.e. the hoses with the "a" designation) through the slide member 118 to the corresponding six hydraulic hoses positioned above the slide member 118 (i.e. the hoses with the "b" designation) which extend toward the forward end of the hydraulic hose control housing 110 as shown. The purpose of the slack or expansion loop in the six hoses is to permit the slide member 118 with the six hydraulic hoses attached to move axially in correspondence with the axial movement of the cutter 30 without substantially stretching or unduly stressing any of the six hydraulic hoses. For example, as the cutter 30 moves axially forward during the cutting process, the slide member 118 also moves forward a corresponding distance. Of course, the forward movement of the slide assembly 118 results in corresponding forward movement of the six hydraulic hoses 92b, 94b, 100b, 102b, 104b and 106b. Thus, the expansion loops in the six hoses 92a, 94a, 100a, 102a, 104a and 106a must be sufficiently large to accommodate at least twelve inches of forward movement of the slide member 118 without any undue stress or stretching thereof. The slide member 118 and the corresponding six hydraulic hoses similarly move rearwardly when the cutter 30 moves rearwardly. In this manner, the six hoses all move forward and rearward together as a single unit to thereby avoid hose entanglements.

The additional, three non-moving hydraulic hoses, 96a, 98a and 108a extend forward from the manifold housing 88 along the bottom of the hydraulic hose control housing 110 as shown in FIGS. 4, 5, 6 and 7. The forward or distal ends of the three hoses 96a, 98a and 108a are connected directly to the holder subassembly 32 and thus are not required to have the ability to move forward with the cutter 30.

As previously indicated, the cutter 30, must have the capability of rotating 180 degrees in either the clockwise or counterclockwise direction (from its 12 o'clock starting position). In order to permit such rotation without unduly stretching or stressing the motor drive hydraulic hoses 92b and 94b means are provided for additional movement of approximately four inches for each of these two hoses. In the present embodiment, the means comprises a pair of independently movable keeper members 120 and 122. As best seen in FIG. 7, the keeper members 120 and 122 are generally I-shaped in cross section to define axially extending grooves 124 on both lateral sides thereof. The keeper members 120 and 122 are installed within a pair of elongated axially oriented slots 126 which extend through the slide member 118 as shown so that the sidewalls of the slots 126 engage and cooperate with the extension of keeper members 120 and 122 into the keeper member grooves 124 as shown in FIGS. 5 and 7. The keeper member grooves 124 are slightly thicker than the thickness of the slide member 118 to provide sufficient clearance to permit the keeper members 120 and 122 to freely move axially along the slots 126. As shown, each of the keeper members 120 and 122 may move independently from the other.

The feed through fluid connectors 92c and 94c which are associated with the hydraulic hoses 92b and 94b employed for driving the motor of the cutter 30 extend through the keeper members 120 and 122 respectively as shown in FIG. 5. In this manner, hydraulic hoses 92b and 94b are free to move axially forward and rearward along with the other movable hydraulic hoses 100b, 102b, 104b and 106b to compensate for the forward and rearward axial movement of the cutter 30 as will hereinafter be described. In addition, hydraulic hoses 92b and 94b are free to independently move forward and rearward by means of the axially slidable keeper members 120 and 122 as required to compensate for the 180 degree rotation of the cutter 30. In order to prevent hydraulic hoses 92b and 94b from becoming entangled during cutter rotation, biasing means, in the present embodiment coil springs 128 are installed within the slide member slots 126 to urge the keeper members 120 and 122 to assume a standard or neutral position approximately halfway along the length of the slot 126 when the cutter 30 is in its initial or starting position (12 o'clock position). If the cutter 30 is rotated in the counterclockwise direction (when viewing the cutter 30 looking down the sewer pipe 24 from the front end) the rotational movement tensions hose 94b, pulling keeper member 122 forward (toward the left) which compresses the coil spring 128 as shown in FIG. 5. Correspondingly, the counterclockwise rotation of the cutter 30 provides additional slack for hose 92b is to be taken up by the keeper member 120 as it moves rearwardly (toward the right) as shown in FIG. 5 to provide a constant tension or tautness upon the hose 92b. Of course, when the cutter 30 is rotated back to its 12 o'clock starting position, keeper member 122 moves rearwardly and keeper member 120 moves forward to their respective starting or neutral positions (not shown) again, to maintain the hoses 94b and 92b respectively in a constant tension or tautness to prevent entanglement.

Figure 11:
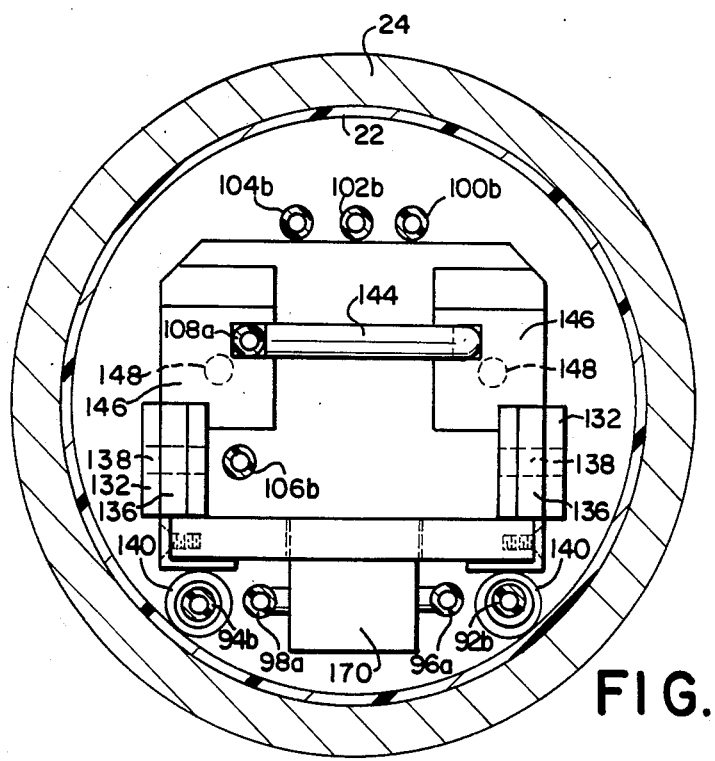
FIG. 11 is a sectional view of a portion of the apparatus taken along line 11—11 of FIG. 10.

As previously indicated, the next forward unit 14 contains both the holder subassembly 32 and the cutter position adjusting subassembly 34. Because of the necessity for maintaining a predetermined length of the various hydraulic hoses it is necessary to maintain a fixed, predetermined distance between the rear end of the holder subassembly 32 and the forward end of the hydraulic hose control subassembly 38. However, it is not possible to fixedly attach the two subassemblies together as was done in conjunction with the hydraulic fluid reservoir 50 and the hydraulic pump 52. If the two subassemblies 32 and 38 were fixedly attached it would not be possible to properly install them within the sewer pipe 24 because of the dimensional restrictions involving the corner between the manhole 46 and the sewer pipe 24 and curves within the sewer pipe 24. Therefore, the two subassemblies 32 and 38 are held together by a pair of elongated members 130 each having a clevis 132 on each end thereof. The clevis on a first or rearmost end of each of the elongated members are pivotally connected directly to the sides of the hydraulic hose control housing 110 utilizing suitable connecting pins 134. Correspondingly, as shown in FIGS. 10 and 11, the clevis 132 on the other (forward) ends of the elongated members 130 are respectively pivotally connected to the sides of the holder subassembly housing 136 utilizing similar connecting pins 138. In this manner, when the two subassemblies 32 and 38 are installed within the sewer pipe 24 the elongated members 130 extend generally parallel to the two subassemblies to maintain a fixed, predetermined distance between the two subassemblies. However, when the units are being installed within the sewer pipe 24 the pivotable clevis and pin connections permit either or both of the subassemblies to pivot relative to each other to provide the necessary flexibility.

Holder Subassembly

Figure 13:
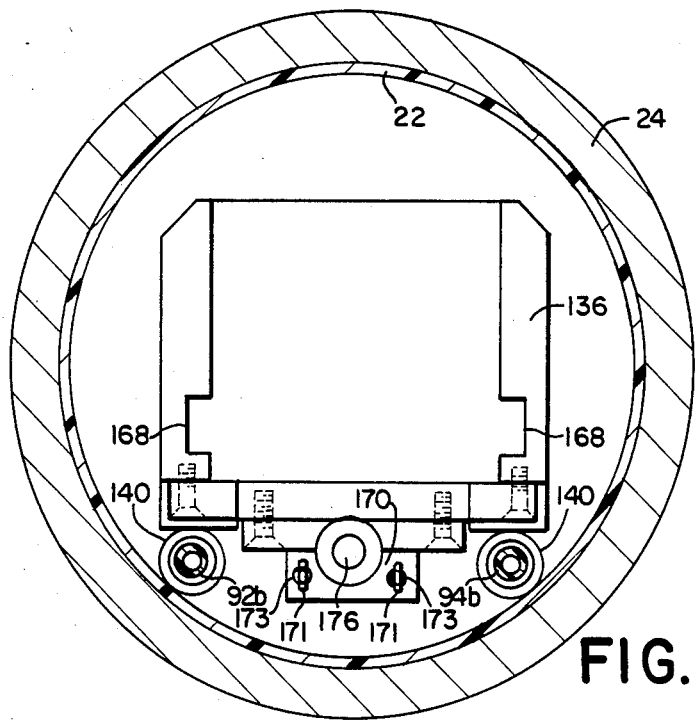
FIG. 13 is a sectional view of a portion of the apparatus taken along line 13—13 of FIG. 10.

Referring now to FIGS. 9, through 13 there is shown the structural details of the holder subassembly 32. As will hereinafter become apparent, the cutter position adjusting subassembly 34 is actually installed for axial movement within the holder subassembly 32. However, in order to simplify the present discussion, each of these subassemblies are separately shown and described, it being understood that in the actual embodiment they are combined together.

Figure 12:
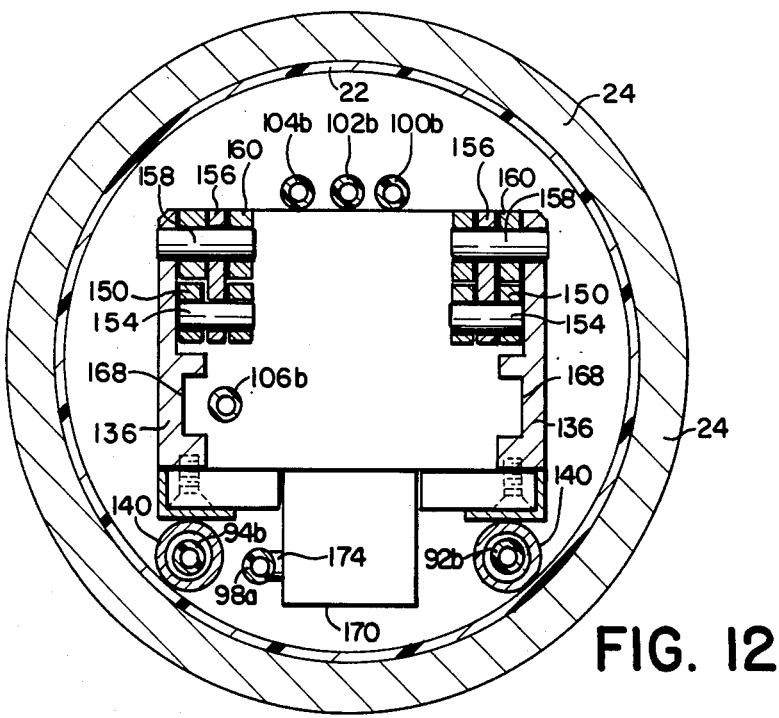
FIG. 12 is a sectional view of a portion of the apparatus taken along line 12—12 of FIG. 10.

The holder subassembly 32 comprises an elongated, generally box-like housing 136. Attached to each side of the bottom of the housing are a pair of supporting skids. As best seen in FIGS. 11-13, the skids in the present embodiment comprise a pair of elongated tubular members, 140 preferably fabricated of steel, within which are disposed the hydraulic hoses 92b and 94b which deliver pressurized hydraulic fluid to operate the cutter 30. The inside diameter of the tubular skid members 140 is slightly greater than the outside diameter of the hydraulic hoses 92b and 94b to permit the hoses to move freely as required along the axial direction. The tubular skid members 140 are attached to the bottom of the holder subassembly housing 136, for example, by welding, or in any other suitable manner.

As previously indicated, the holder subassembly 32 includes first hydraulically actuated means for securing or locking the operational units of the cutter apparatus 10 and particularly the holder housing 136 in a fixed axial position within the sewer pipe 24. To achieve the locking function, the first hydraulically actuated means includes a pair of locking arms 142 which are pivoted upwardly to engage the sewer pipe 24 as shown in phantom in FIG. 9. Each of the locking arms 142 are separately hydraulically actuated and are raised and maintained in the locking position in a manner which will hereinafter be described. For purposes of describing the structure and operation of the locking feature, only a single locking arm will be described, it being understood that the exact same structure and operation applies to the other locking arm.

As shown in FIGS. 10 and 11, hydraulic hose 108a is attached to the rear end of the holder subassembly housing 136. An extension hose 144 is provided to distribute hydraulic fluid received from hose 108a to both sides of the holder subassembly housing 136. Both ends of the extension hose 144 are suitably connected to fluid input ports (not shown) of a pair of first hydraulic cylinders 146 one of which is disposed on each lateral side of housing 136. The first hydraulic cylinders 146 are of a type well known in the art and generally commercially available. Specific details of the structure and operation of hydraulic cylinders 146 are well known and will not be presented herein. Suffice to say that upon the application of pressurized hydraulic fluid to one side of the hydraulic cylinder, the fluid causes a piston (not shown) within the cylinder to displace axially along the cylinder (toward the left when viewing FIG. 10). A piston rod 148 which is attached to the piston (not shown) extends through a suitably sealed opening (not shown) in the forward end of the hydraulic cylinder 146 for movement with the piston.

As best shown in FIG. 9, linking means are provided for interconnecting the first hydraulic cylinder 146 with the locking arm 142 so that translation of the piston causes the locking arm to pivot outwardly to engage the sewer pipe 24. In the present embodiment the linking means includes a short strut member 150 the first or rearward end of which is secured to the distal end of the piston rod 148. The other (forward) end of the strut member 150 contains a clevis 152 oriented generally vertically as shown. The clevis is connected by a suitable pin 154 to the first or lower end of a bell-crank member 156 the other leg of which is secured to the locking arm 142 as shown. The portion of the bell-crank member 156 proximate the meeting place of the two legs is connected by a suitable pin 158 to a generally vertically oriented clevis 160 of the holder subassembly housing 136.

In operation, when the pressurized hydraulic fluid is applied to the rear end of the hydraulic cylinder 146, the piston (not shown) translates axially forward (toward the left), thereby also moving the piston rod 148 forward. The forward movement of the piston rod 148 also moves the strut member 150 forward. The movement of the strut member 150 causes the bell crank member 156 to rotate about pin 158 and to thereby raise the attached locking arm 142 to the position as shown in phantom in FIG. 9.

As long as pressurized fluid which exceeds a predetermined minimum is applied to the rear of the pistons 146 the locking arms 142 remain in engagement with the sewer pipe 24 (as shown in phantom in FIG. 9) to lock the cutter apparatus 10 in place therein. Hydraulic cylinders 146 are spring loaded for return and when pressure is released a three way solenoid valve returns the hydraulic fluid to the hydraulic fluid reservoir and locking arms 142 are fully retracted. By providing spring loaded return for hydraulic cylinders 146 as means for holding the operational units of the cutter apparatus 10 in place within the sewer pipe 24 if the hydraulic system should fail or if some other such malfunction should occur, the locking arms 142 will automatically disengage from the sewer pipe 24 and retract inwardly or downwardly. In this manner, the operational units of the cutter apparatus 10 can be conveniently removed from the sewer pipe 24 for testing and/or repair. This retraction feature is particularly advantageous because in some prior art devices of this type, if the locking mechanism failed when in the locked position the sewer pipe would have to be dug up to permit the removal of the device.

In order to protect the liner 22 from damage which may result from the engagement by the locking arms 142, each of the locking arms includes an engagement means, in the present embodiment a generally flat rectangularly shaped spring steel member 162 which is attached to the distal end thereof by suitable means, for example bolts or screws 164. As shown in FIG. 9, it is the spring steel members 162 which actually engage the sewer pipe liner 22.

A portion of the distal ends of each of the locking arms 142 has been removed at least in the area beneath the spring steel members 162 to create a generally open notch 166. As the locking arms 142 move upwardly, the spring steel members 162 initially engage the sewer pipe liner 22 and are bent inwardly into the notches 166 as shown to prevent any sharp, potentially damaging surface contact between the locking arms 142 and the sewer pipe liner 22.

As previously stated, the cutter position adjusting subassembly 34 is contained within and supported by the holder subassembly housing 136. For this purpose, a pair of axially extending guide slots 168 are provided within the inner walls of the holder subassembly housing 136 as shown in FIGS. 12 and 13. As will hereinafter be described in greater detail, the cutter position adjusting subassembly 34 is supported by and moves axially along the guide slots 168 to thereby move the cutter 30 to facilitate the cutting of the liner 22. Axial movement of the cutter position adjusting subassembly is produced by the second hydraulically actuated means which includes a second hydraulic cylinder 170 secured to and located proximate to the lower end of the holder subassembly housing 136. The second hydraulic cylinder 170 extends generally parallel to the axis of the sewer pipe 24. As with any other type of hydraulic cylinder, cylinder 170 includes a piston (not shown) which translates axially along the cylinder in response to the pressure of hydraulic fluid. Hydraulic hoses 96a and 98a are connected to fluid ports 172 and 174 located at the rear and front ends respectively of the hydraulic cylinder 170 as shown. Hydraulic fluid received through hydraulic hose 96a and port 172 causes the piston (not shown) to move forward (towards the left when viewing FIG. 10). Correspondingly, the application of pressurized fluid received through hydraulic hose 98a and port 174 causes the piston (not shown) to move rearwardly (toward the right when viewing FIG. 10). A piston rod 176 is attached to the piston (not shown) for movement therewith. The piston rod 176 is connected to the cutter position subassembly 34 so by means of lock nuts 175 that the movement of the piston within the hydraulic cylinder 170 results in axial movement of the cutter position adjusting subassembly 34 along guide slots 168 and, corresponding axial movement of the cutter 30.

As shown in FIG. 13, the housing 136 includes suitable attachment means, preferably a pair of eye bolts 171 to which is attached suitable connecting means, in the present embodiment cables 173. The other ends of the cables 173 are similarly attached to the rear or right end of the video camera and audio subassembly as shown in FIG. 1.

Cutter Position Adjusting Subassembly

Referring now to FIGS. 14 through 21, there is shown in more detail the cutter position adjusting subassembly 34. It is this subassembly which actually causes the cutter 30 to rotate 180 degrees in either direction as well as causing the cutter 30 to move radially inwardly or outwardly during the cutting operation. In addition, as previously discussed, it is the axial forward and backward motion of this subassembly (as moved by hydraulic cylinder 170) which results in the forward and backward axial movement of the cutter 30.

Figure 16:
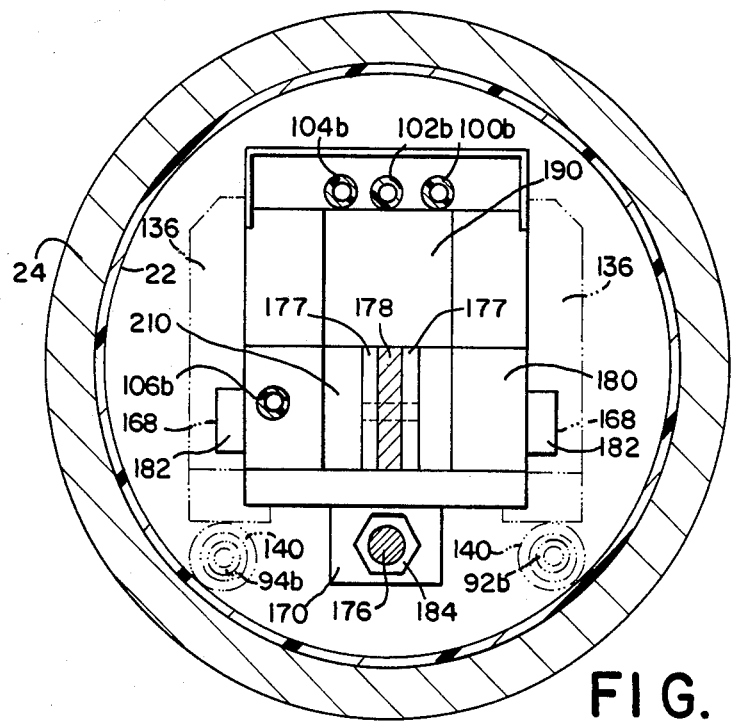
FIG. 16 is a sectional view of a portion of the apparatus taken along line 16—16 of FIG. 15.
Figure 19:
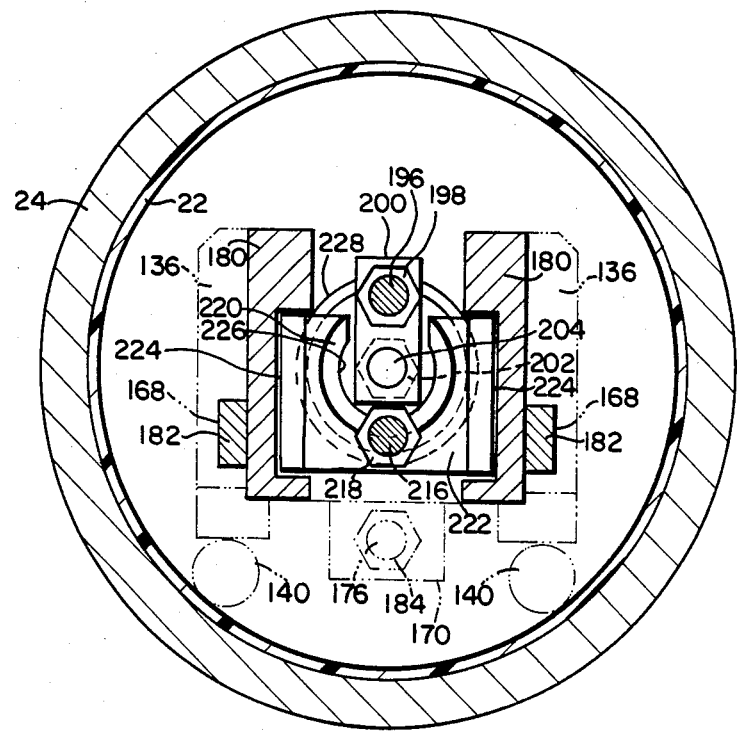
FIG. 19 is a sectional view of a portion of the apparatus taken along line 19—19 of FIG. 15.

The cutter position adjusting subassembly 34 comprises an elongated housing 180 which, as shown in FIG. 19, in the present embodiment is generally square in cross section with a generally open center portion. As is also shown in FIG. 19, the housing 180 includes a pair of elongated lugs or tongues 182 which extend into and engage the interior axial guide slots 168 of the holder subassembly housing 136 (shown in phantom). As shown in FIGS. 14 and 16, a downwardly extending flange 181 on the bottom of the housing 180 is secured to the piston rod 176 by suitable means, for example, a pair of lock nuts 184. In this manner, the housing 180 moves forward and backward (toward the left or right respectively) along the axial guide slot 168 in accordance with the movements of the piston rod 176 as hereinbefore described. As will hereinafter become apparent, the cutter 30 is attached to the housing 180 for axial movement therewith.

As previously discussed, the slide member 118 of the hydraulic hose control subassembly 38 is provided to slide axially in accordance with the axial movements of the cutter 30. Such action is obtained by connecting the slide member 118 to the rear end of the cutter position adjusting subassembly housing 180. A downwardly extending flange member 119 is secured (for example by screws as shown in FIG. 6) to the underside of the slide member 118. A connecting member 178 having a clevis 179 on one end is pin connected to flange member 119 as shown in FIG. 5. The other end of the connecting member 178 is similarly pin connected to a clevis 177 on the rear end of the cutter position adjusting subassembly housing 180 (see FIGS. 14 and 16). In this manner the slide member 118 and the cutter position adjusting subassembly housing 180 move axially forward and rearward together with a predetermined distance (the length of the connecting member 178) being maintained therebetween. Since the connection between the housing 180 and the slide member 118 is obtained by pins, flexibility is maintained to facilitate installation and removal from the sewer pipe 24.

Referring now to FIGS. 14 and 15 there is shown the details of the structure employed for radial inward and outward movement of the cutter 30. As shown, the third hydraulically actuated means includes a generally axially oriented third hydraulic cylinder 190 of the type previously described and is positioned near and secured to the upper rear end of the housing 180. Hydraulic hoses 100b and 102b are connected respectively to fluid ports 192 and 194 located on the front end and rear end respectively of the third hydraulic cylinder 190. Extending outwardly from the forward end of the cylinder 190 is a piston rod 196 which, of course, is attached to a piston (not shown) which moves axially along the interior of the hydraulic cylinder 190. As with the previously described hydraulic cylinders, the application of pressurized hydraulic fluid through hydraulic hose 100b and port 192 results in the piston (not shown) and the piston rod 196 moving rearwardly (toward the right when viewing FIGS. 14 and 15). Correspondingly, the application of pressurized hydraulic fluid from hydraulic hose 102b through port 194 results in the piston and piston rod 196 moving forward (toward the left). The piston rod 196 is connected to the cutter by linking means as will hereinafter be described for radial movement of the cutter motion in accordance with the translation of the piston rod.

Figure 18:
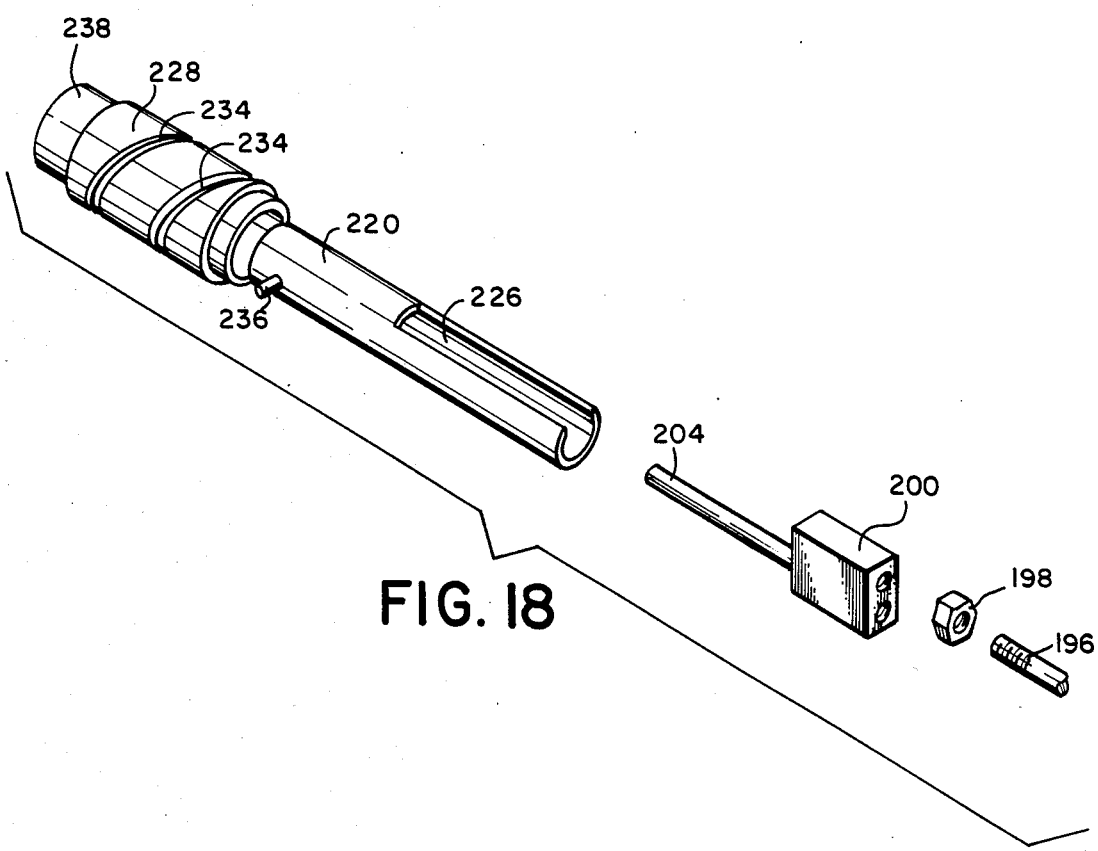
FIG. 18 is an exploded perspective view of a portion of the apparatus of FIG. 1.

As best seen in FIGS. 18 and 19, the distal end of the piston rod 196 is secured by suitable means, for example a pair of lock nuts 198 to a generally box-like connecting member 200. Correspondingly, the connecting member 200 is connected by suitable means, for example, lock nuts 202, to a generally cylindrical rod or shaft 204 which, as shown in FIGS. 14 and 15, extends forward and slightly beyond the end of the cutter position adjusting subassembly housing 180.

The primary purpose of the connecting member 200 is to connect piston rod 196 to shaft 204 so that the two move axially together. Thus, axial movement of the piston rod 196 results in corresponding axial movement of shaft 204. As will hereinafter be described in greater detail, forward movement of the shaft 204 causes the cutter 30 to move radially outwardly whereas rearward movement of the shaft 204 results in the cutter 30 moving radially inwardly.

Rotational movement of the cutter 30 is affected by the fourth hydraulically actuated means which comprises a fourth generally axially oriented hydraulic cylinder 210 which is located at the lower rear of the housing 180 beneath and generally aligned with the previously described third hydraulic cylinder 190. Hydraulic hoses 104b and 106b are attached to suitable hydraulic fluid ports 212 and 214 for the purpose of providing pressurized hydraulic fluid to the forward and rear ends respectively of fourth hydraulic cylinder 210. A piston rod 216 extends outwardly from the forward end of hydraulic cylinder 210 for axial movement with the piston (not shown) installed within the cylinder 210. As with the previously described hydraulic cylinders, the application of pressurized hydraulic fluid through hydraulic hose 104b to the forward end of hydraulic cylinder 210 results in the piston and piston rod 216 moving rearward whereas the application of hydraulic fluid through hydraulic hose 106b to the rear end of hydraulic cylinder 210 results in the piston and piston rod 216 moving forward.

As best seen in FIG. 19, piston rod 216 is secured by suitable means, for example, lock nuts 218, to a a generally rectangularly shaped supporting member 222 which is attached to the rear end of a first generally cylindrical, tubular member 220. As shown, the supporting member 222 is installed within a pair of suitably sized guide slots 224 within the interior walls of the housing 180 to facilitate axial movement thereof. At the axial position shown in FIG. 19, the supporting member 222 and the first tubular member 220 are secured to each other for concurrent axial movement.

As is also apparent from FIGS. 18 and 19, shaft 204 is concentric with and extends within tubular member 220. The rear end of the tubular member 220 includes a hollowed out slot portion 226 which accommodates the previously described connecting member 200 and piston rod 196 associated with third hydraulic cylinder 190. In this manner, these components which are associated with hydraulic cylinder 190 and shaft 204 may move axially within the housing 180 independently of any movement of the piston rod 216, tubular member 220, support member 222 and the other components associated with fourth hydraulic cylinder 210. Correspondingly, as previously described, housing 180 also moves axially with respect to holder subassembly housing 136 independently of the movement of the components associated with either third hydraulic cylinder 190 or fourth hydraulic cylinder 210. In this manner, it is possible to independently move the cutter 30 axially, radially or rotationally or any combination thereof.

Figure 21:
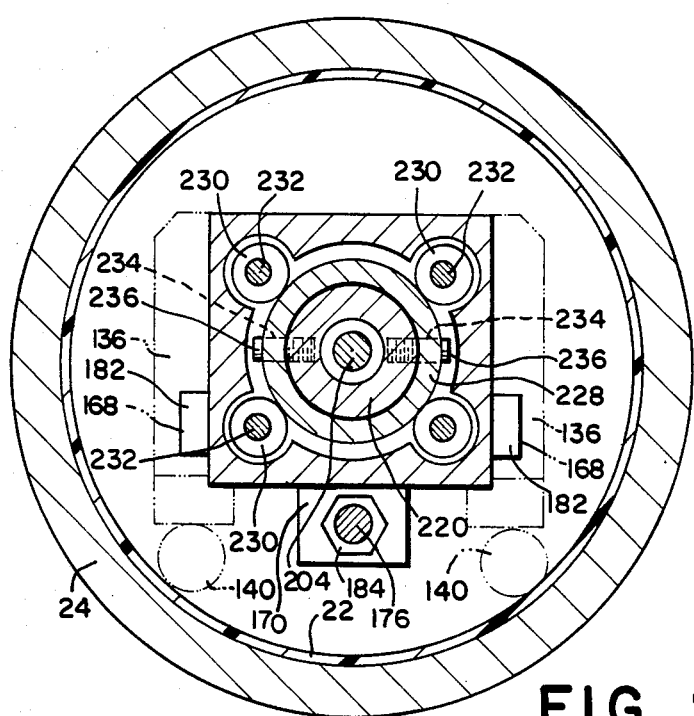
FIG. 21 is a sectional view of a portion of the apparatus taken along line 21—21 of FIG. 15.
Figure 17:
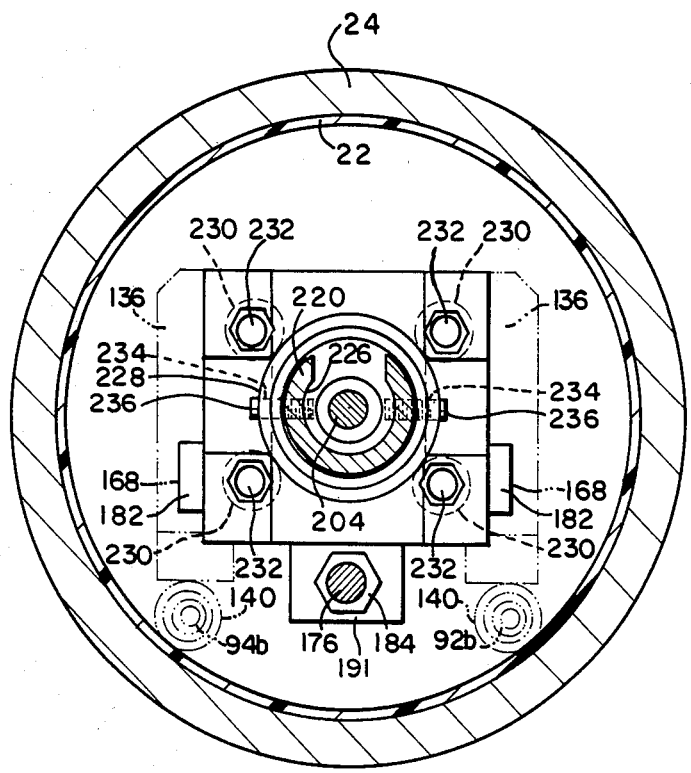
FIG. 17 is a sectional view of a portion of the apparatus taken along line 17—17 of FIG. 15.

In order to provide for rotation of the cutter 30, the cutter position adjusting subassembly 34 includes means for converting the axial translational movement of the tubular member 220 into rotational movement. In the present embodiment, the converting means comprises a second cylindrical tubular member 228 with an inner diameter which is slightly greater than the outer diameter of the first or inner tubular member 220. The outer tubular member 228 surrounds at least the forward portion of the inner tubular member concentrically 220 as shown in FIGS. 14, 15 and 21. The outer tubular member 228 is journaled for rotation within two sets of roller bearings, shown individually as 230, which are secured to the housing 180 by any suitable means, for example an equal number of bolts 232. In the present embodiment, there are four roller bearings 230 located at the rear end of the outer tubular member 228 and four roller bearings 230 positioned at the forward end of the outer tubular member 228 as best seen in FIGS. 14 and 15. In this manner, the outer tubular member 228 is conveniently supported by the roller bearings 230 for rotation relative to the housing 180.

The outer tubular member 228 further includes a pair of generally helical slots 234 extending therethrough and running from the rear end to the forward end as shown. A pair of lugs or pins 236 are secured to the outer surface of the inner tubular member 220 and extend radially outwardly and into the helical slots 234 of the outer tubular member 228. Axial movement of the inner tubular member 220 causes the lugs 236 to cooperate with and move along the helical slots 234 thereby causing the outer tubular member 228 to rotate within the supporting roller bearings 230. As shown, forward axial movement by the inner tubular member 220 causes the outer tubular member 228 to rotate in the clockwise direction when viewing the cylinder from front to rear as shown in FIG. 21. Correspondingly, rearward axial movement of the inner tubular member 220 causes the outer tubular member 228 to rotate in a counter-clockwise direction when viewing in the same manner.

As best seen in FIG. 18, the forward end of the outer tubular member 228 includes an annular flange portion 238 having an outer diameter which is slightly less than the outer diameter of the remainder of the tubular member 228. The annular flange portion 238 extends through a suitable circular opening in the forward end of the housing 180 (see FIGS. 14 and 15). The forward face 240 of the annular flange portion 238 includes four circumferentially spaced apart studs 242 extending perpendicularly therefrom. Similarly spaced between the four studs 242 are four generally circular threaded openings 244. Both the studs 242 and the openings 244 comprise one-half of an eight bolt circle which is employed to attach the outer tubular member 228 to the cutter 30 in a manner which will hereinafter become apparent. Thus, rotation of the outer tubular member 228 results in the rotation of the cutter 30, the direction of rotation being determined by the axial movement of the hydraulic piston rod 216 and the inner tubular member 220.

Cutter Subassembly

Referring now to FIGS. 22 through 28, there is shown more details of a preferred embodiment of the cutter subassembly 28 and cutter 30. The present embodiment of the cutter 30 includes a hydraulically driven motor 252 which is supported by a box-like cutter housing 250.

The generally cylindrical hydraulic motor 252 is of a type which is well known and generally commercially available. Details of the structure and operation of the motor 252 are generally known and will not be presented herein. Suffice to say that the motor 252 includes an inlet port 254 for receiving pressurized hydraulic fluid from hydraulic hose 92b and an outlet or return port 256 for discharging hydraulic fluid to hydraulic hose 94b. The hydraulic motor 252 receives the pressurized hydraulic fluid and converts the energy thereof into rotary motion of the motor output shaft 258. In order to permit relatively high speed rotation of the output shaft 258, suitable high speed bearings 260 are provided. The distal end of the output shaft 258 includes a cutting tool 262, which may include cutting teeth for engaging and cutting the sewer pipe liner 22.

Figure 22:
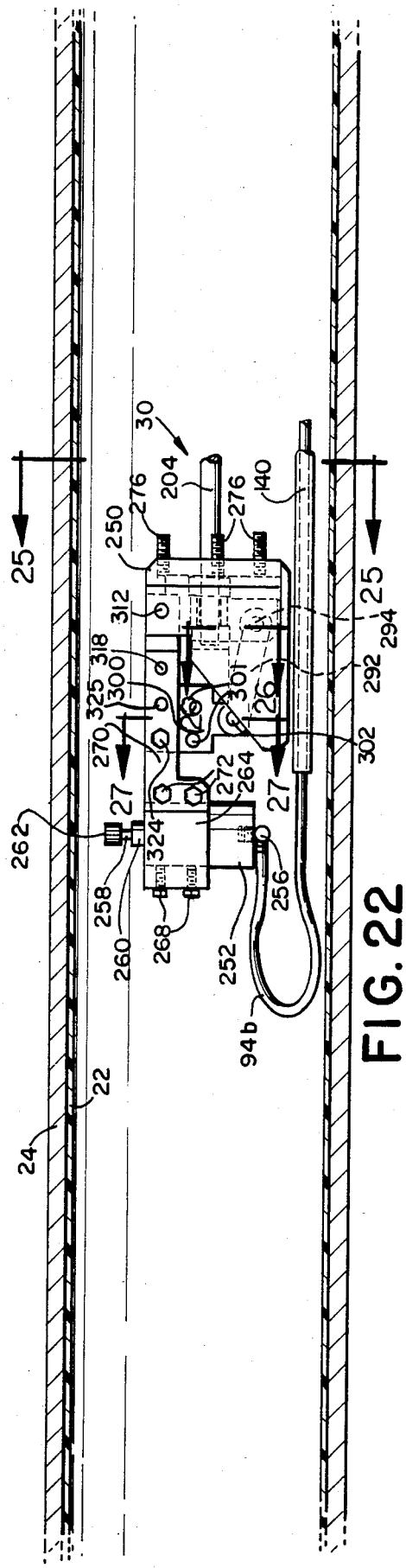
FIG. 22 is an enlarged elevation view of the cutter portion of the apparatus of FIG. 1.
Figure 23:
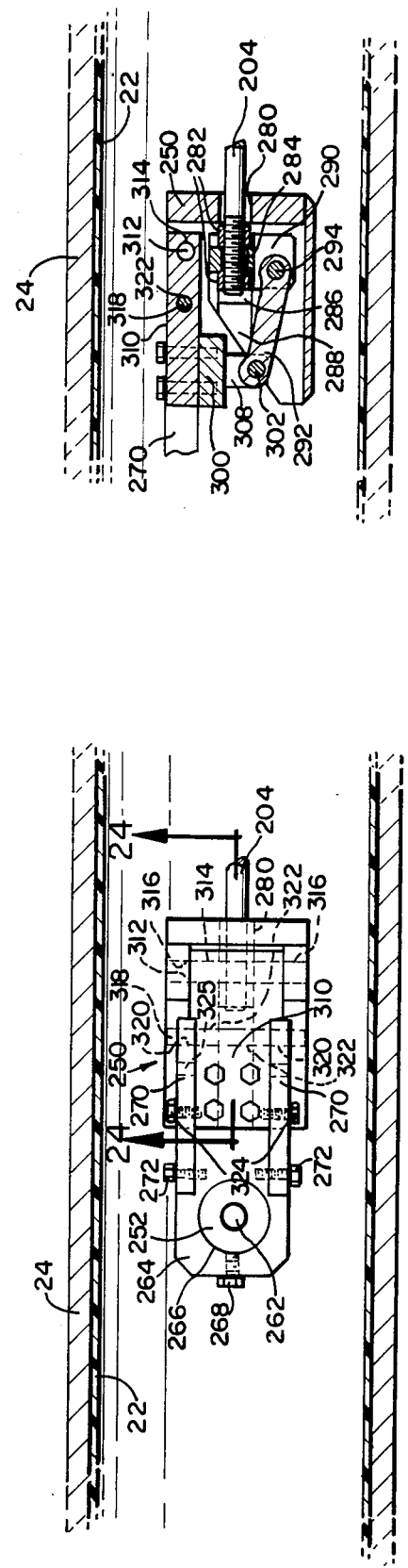
FIG. 23 is a plan view of the portion of the apparatus shown in FIG. 22.
Figure 25:
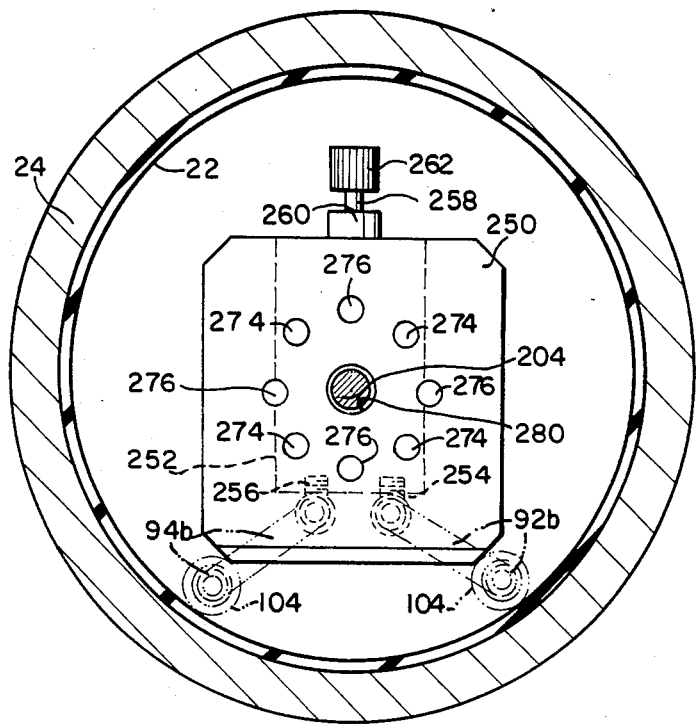
FIG. 25 is a sectional view of a portion of the apparatus taken along line 25—25 of FIG. 22.

As shown in FIG. 22, the hydraulic cutter motor 252 is positioned at the forward end of the cutter housing 250. A cutter motor housing 264 having a circular opening 266 extending generally vertically therethrough surrounds and supports the cutter motor 252. Adjustment screws 268 extend through suitable openings in the cutter motor housing 264 to engage and hold the hydraulic cutter motor at a desired height within the cutter motor housing 264. For purposes which will hereinafter become apparent, the cutter motor housing 264 is secured to supporting means, in the present embodiment a pair of pivotable support arms 270 which are associated with the cutter housing 250. As best seen in FIG. 23, one of the support arms 270 is disposed on each lateral side of the cutter housing 250. The cutter motor housing 264 may be secured to the support arms 270 by any suitable means, for example, by bolts 272.

Figure 20:
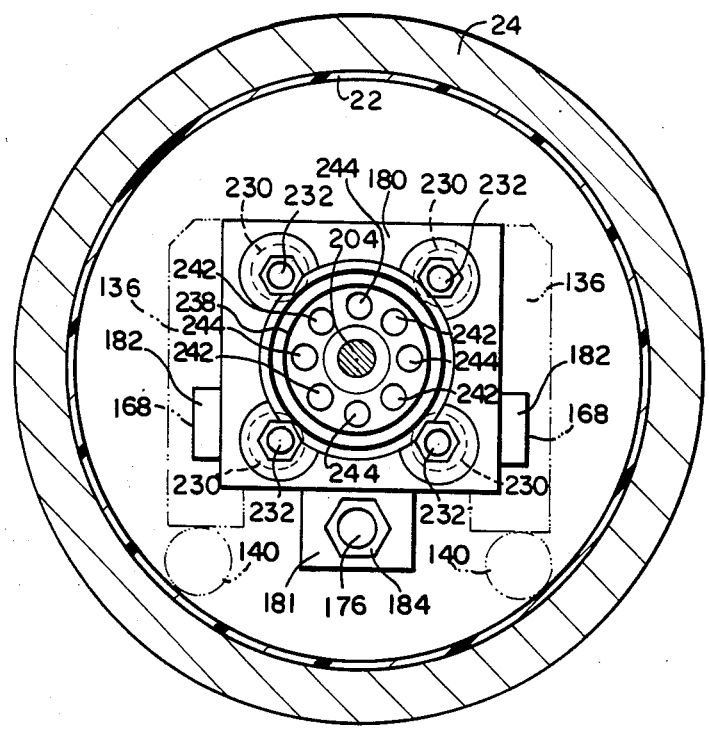
FIG. 20 is a sectional view of a portion of the apparatus taken along line 20—20 of FIG. 15.

As has been previously described in connection the discussion of FIG. 20, the cutter housing 250 is attached to the forward end of the cutter position adjusting subassembly 34 by eight bolts or studs which are suitably spaced apart and arranged to form a bolt circle. Four of the studs 242 (FIG. 20) extend forward from the forward face of the rotatable annular flange portion 238 for engagement with four suitably positioned openings 274 provided on the rearward face of the cutter housing 250 (see FIG. 25). Correspondingly, the rearward face of the cutter housing 250 includes four studs 276 which extend rearwardly for engagement with the circular threaded openings 244 in the forward face 240 of the annular flange portion 238. The cutter housing 250 is secured to and supported by the cutter adjusting subassembly 34 utilizing the eight studs 242 and 276. No other support is provided to the cutter housing 250. In this manner, the cutter housing 250 is free to move in accordance with the rotational movement of the outer tubular member 228 and to move axially forward and rearward in accordance with the corresponding, previously described axial movement of the cutter position adjusting housing 180. Inward and outward radial movement of the cutter motor 252 is accomplished by forward and rearward axial movement of shaft 204 in a manner which will hereinafter become apparent.

Figure 24:
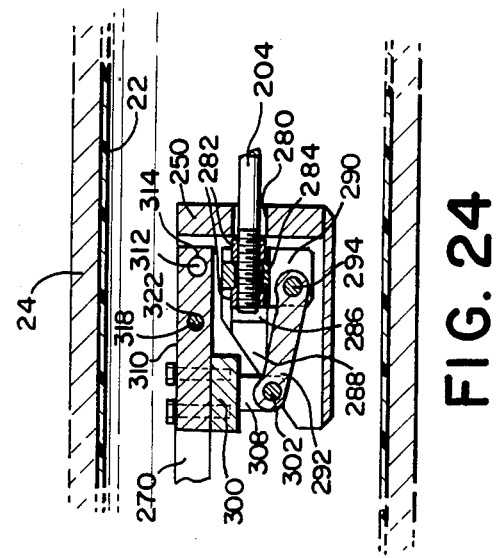
FIG. 24 is a sectional view of a portion of the apparatus taken along line 24—24 of FIG. 23.
Figure 26:
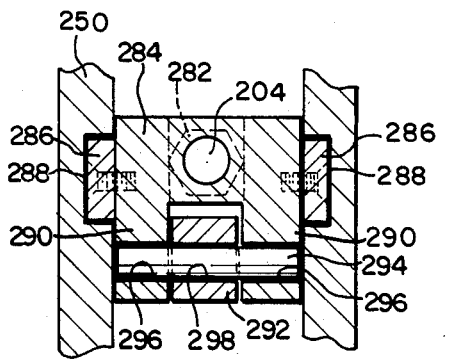
FIG. 26 is a sectional view of a portion of the apparatus taken along line 26—26 of FIG. 22.

The cutter radial movement shaft 204 extends through a generally circular opening 280 in the rear surface of the cutter housing 250 and passes into the housing as shown in FIGS. 22 and 24. The forward end of the shaft 204 is secured by suitable means, for example, a pair of nuts 282 which engage suitable threads (not shown) on the shaft, to linking means which includes a shaft connector member 284. As best seen in FIGS. 24 and 26, the shaft connector member 284 is generally rectangular in cross-section and includes a pair of outwardly extending tongues or lugs 286 one of which is located on each lateral side as shown. The lugs 286 are slightly smaller than a corresponding pair of generally axially oriented guide slots or grooves 288 which are cut into the interior lateral surfaces of the corresponding interior sides of the cutter housing 250 as shown. The grooves 288 and lugs 286 are provided to maintain straight and level axial movement of the shaft connector member 284 along the housing 250 in correspondence with the axial movement of the shaft 204.

The shaft connector member 284 further includes a pair of spaced apart, downwardly extending legs 290 which form a clevis as shown in FIG. 26. A first, rearward end of an elongated linking member 292 is located between the shaft connector member legs 290 and is pivotally connected thereto by means of a suitable pin 294 which extends through suitably sized and positioned openings 296 and 298 within the shaft connector member legs 290 and the linking member 292 respectively.

Figure 27:
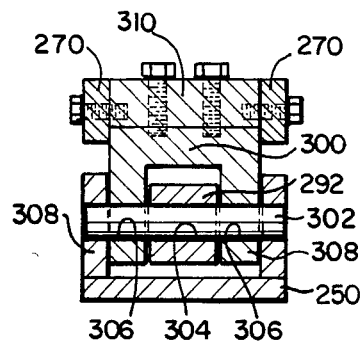
FIG. 27 is a sectional view of a portion of the apparatus taken along line 27—27 of FIG. 22.

As best seen in FIGS. 22, 24 and 27, the second, forward end of linking member 292 is similarly pivotally connected to an irregularly shaped lifting member 300. More specifically, the lifting member 300 includes a pair of spaced apart, downwardly extending legs 308 which form a clevis (best seen in FIG. 27). The forward end of linking member 292 is connected to lifting member 300 by a suitable pin 302 which extends through suitable openings 304 and 306 within the linking member 292 and the lifting member legs 308 respectively. In this manner, the linking member 292 is used to transmit the motion of the shaft connector member 284 to the lifting member 300.

As best seen in FIG. 24, the lifting member 300 is generally L-shaped in axial cross section including a downwardly extending portion (which includes legs 308) and a generally horizontal portion 310. The rear end of the horizontal portion 310 is pivotally connected to housing 250, for example, by a suitable pin 312 which extends through similar suitably sized openings 314 and 316 within the lifting member horizontal position 310 and the sides of the housing 250 respectively.

As best seen in FIGS. 22 and 23, the rearward ends of the cutter motor supporting arms 270 are similarly attached to the respective sides of the lifting member horizontal position 310 utilizing a suitably sized pin 318 which extends through suitably sized and positioned openings 320 and 322 within the support arms 270 and horizontal lifting member position 310 respectively. For purposes which will hereinafter become apparent, a pair of openings 325 is provided on each of the supporting arms 270. A pair of bolts 324 extend through one of the supporting arm openings 325 for attaching the supporting arms 270 to the forward end of the horizontal lifting member portion 310 as shown. In this manner, the supporting arms 270 and thus the cutter motor 252 are secured to the horizontal lifting member portion 310 for movement therewith.

Figure 28:
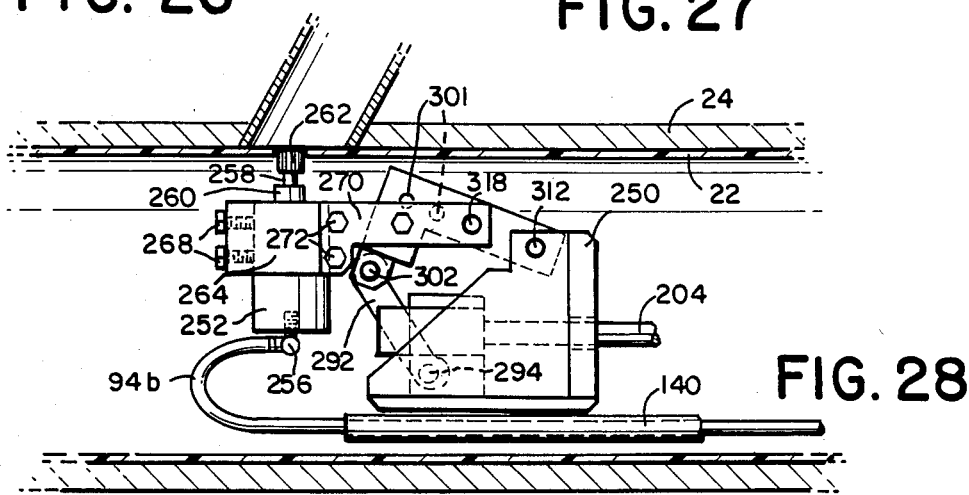
FIG. 28 is an enlarged elevation view of the cutter portion of the apparatus of FIG. 1 showing the cutter motor moved radially outwardly for contacting the liner.

In operation, as best seen in FIGS. 22 and 28, radial inward and outward movement of the cutter motor 252 is accomplished by axial movement of the shaft 204 as hereinafter described. Forward axial movement of the shaft 204 results in corresponding forward axial movement of the shaft connector member 284. As previously discussed, the grooves 288 within the inner surface of the cutter housing 250 cooperates with the shaft connector member lugs 286 to maintain the forward movement of the shaft connector member 284 in a generally straight, axial manner.

The axial forward movement of the shaft connector member 284 pushes the pin connected linking member 292 forward and radially outward (upward) as shown in FIG. 28. The forward and upward movement of the linking member 292 pushes upwardly on the lifting member 300 causing the lifting member to pivot upwardly about pin 312. The upward pivoting movement of the lifting member 300 results in a corresponding upward movement of the motor supporting arms 270 and corresponding radial outward movement of the motor 252. Radial inward movement of the cutter motor 252 is accomplished by rearward (towards the right) movement of the shaft 204 and a corresponding downward or inward movement of the linking member 292 and the lifting member 300. As shown in FIGS. 21 and 28, forward movement of the shaft results in the hydraulic motor 252 moving upwardly. However, if the cutter housing 250 had been rotated in one direction or the other the movement of the motor 252 would be correspondingly radially outwardly.

It is preferable to maintain the cutting tool 262 oriented so that it remains generally perpendicular to the sewer pipe 24. In some applications, for example, due to differences in the size of the sewer pipe, it may be necessary or desirable to vary the orientation angle at which the cutter motor housing 264 is positioned as it is moved radially outwardly in order to maintain the perpendicular relationship between the cutting tool 262 and the sewer pipe 24. In the present embodiment, variations in the angle of orientation of the cutter motor housing 264 may be obtained by changing the orientation of the cutter motor support arms 270 with respect to the horizontal lifting member portion 310. Such action is accomplished by removing the forward attachment bolts 324 which connect the supporting arms 270 to the sides of the lifting member horizontal portion 310. Once the bolts 324 have been removed, the supporting arms 270 and the cutter motor housing 264 are free to pivot about pin 318 relative to the lifting member horizontal portion 310. The openings 325 in the support arms may then be aligned with any of a plurality of spaced apart openings 301 within the lifting member 300 to provide a desired cutter orientation angle. The support arm openings 325 and the lifting member openings 301 cooperate to provide for changing the orientation angle of the cutter motor housing 264 in five degree increments over a range of from 0 degrees (perpendicular to the sewage pipe liner 22 as shown in Fig. 22) to 35 degrees (shown in FIG. 28). The openings 301 and 325 may be suitably marked (not shown) to indicate the orientation angle of the cutter motor housing 264. Of course, the orientation angle of the cutter motor housing 264 must be selected prior to the installation of the cutter 30 within the sewer pipe 24. By permitting the orientation angle of the cutter motor housing 264 to be easily adjusted in this manner, the same cutter 30 may be employed for cutting liners in a much greater variety of sewer pipes having different diameters and connecting laterals of different orientations.

Figure 29:
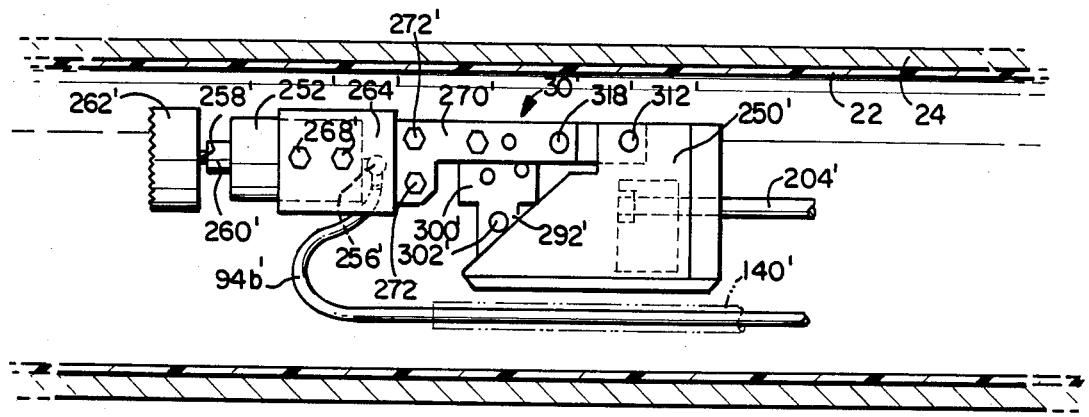
FIG. 29 is an elevation view of a slightly different configuration of the cutter portion of the apparatus which is shown in FIG. 22.
Figure 30:
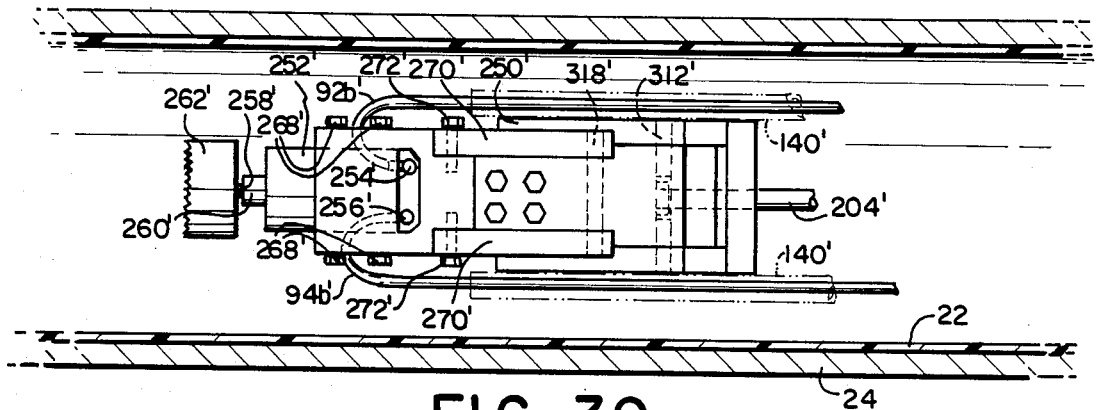
FIG. 30 is a plan view of the configuration of the apparatus shown in FIG. 29.

Referring now to FIGS. 29 and 30, there is shown a variation of the cutter 30 of the present invention with the cutting tool oriented axially. In connection with the description of FIGS. 29 and 30, components which are the same as those of the above-described preferred embodiment are given the same reference numerals but with the addition of primes (') thereto.

As can be seen from FIGS. 29 and 30, the structure of the cutter 30' is substantially the same as that of the cutter 30 as shown in FIG. 22 through 28. However, in the variation shown in FIGS. 29 and 30 the cutter motor housing 264' has been rotated 90 degrees so that the cutter motor 252' and the cutting tool 262' are axially oriented. This is accomplished by a slightly different pair of support arms 270' having attachment bolts 272' which are positioned as shown to engage and hold the cutter motor housing 264' in the axially oriented position.

With the cutter motor 252' and the cutting tool 262' oriented axially, any stray lining material or foreign material of any other nature which may be blocking the sewer pipe 24 may be conveniently cut away for removal. Of course, the axial, rotational and radial movement of the cutter 30' is accomplished in exactly the same manner as described above in connection with the embodiment shown in FIGS. 22-28. Likewise, the angle of orientation of the cutter motor 252' may be varied in the same manner as previously described.

Cutter Subassembly-Alternate Embodiment

Referring now to FIGS. 31 through 34, there is shown an alternate embodiment of the cutter 30 of the present invention. Again, as used in connection with the description of FIGS. 31 through 34 elements which are the same or substantially the same as those of the preferred embodiment of FIGS. 22 through 28 are given the same number but with the addition of double primes (") thereto.

There is shown in FIGS. 31 through 34 a box-like cutter housing 250" which is secured to the forward end of the cutter position adjusting subassembly 34 by any suitable means such as a circular configuration of eight bolts or studs in the manner as described above in connection with the embodiment of FIGS. 22 through 28. In this manner, both the rotational and axial movement of the cutter housing 250" may be accomplished in exactly the same manner as was previously described in connection with the preferred cutter embodiment.

The rearward end of the cutter housing 250" includes a suitably sized opening through which extends cylindrical shaft 204" which is employed to effect radial inward and outward movement of the cutter motor 252". The shaft 204" moves axially in the manner as described above in connection with the preferred embodiment.

Figure 31:
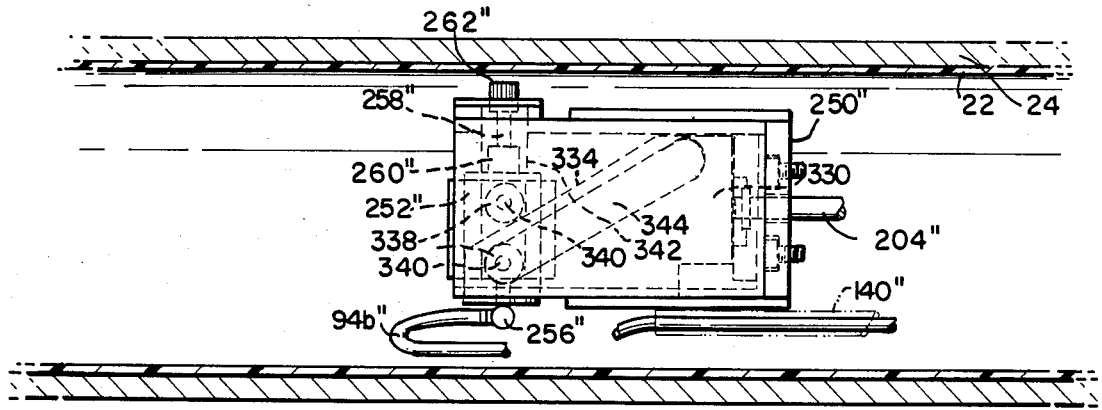
FIG. 31 is an elevation view of an alternate embodiment of the cutter portion of the apparatus of FIG. 1.
Figure 32:
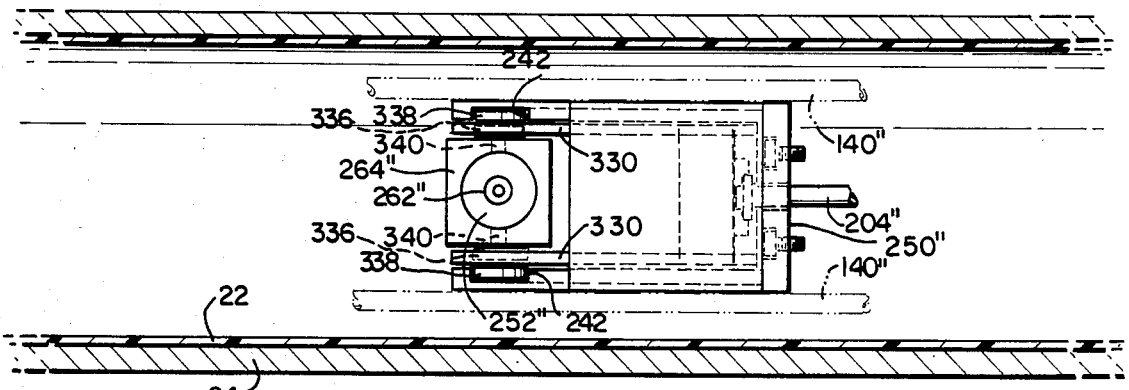
FIG. 32 is a plan view of the embodiment of the apparatus shown in FIG. 31.
Figure 33:
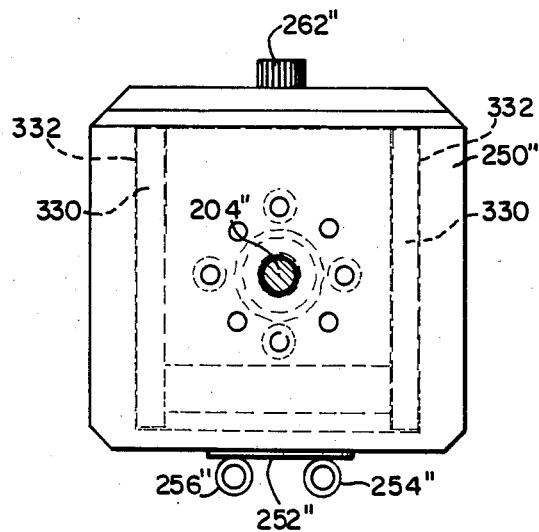
FIG. 33 is a rear or right end view of the embodiment of the apparatus shown in FIG. 31.
Figure 34:
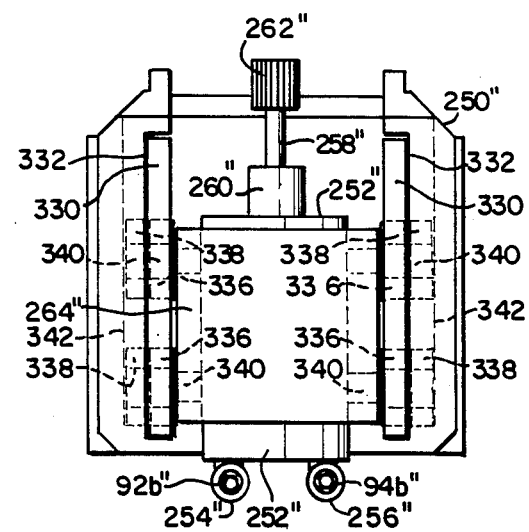
FIG. 34 is a front or left end view of the embodiment of the apparatus shown in FIG. 31.

The shaft 204" is suitably secured to the rear surface of a box-like lifting subhousing 330. As best seen in FIGS. 32 and 34, the lifting subhousing 330 is installed and supported within a pair of generally axially extending guide slots 332 within the interior of the lateral sidewalls of the cutter housing 250". In this manner, the cutter lifting subhousing 330 may slide axially forward and backward within the guide slots 332 in accordance with the movement of shaft 204". In the present embodiment, for purposes which will hereinafter become apparent, the forward portion of the lateral sidewalls of the cutter lifting subhousing 330 slope downwardly to provide camming means as shown at slope portion 334 in FIG. 31.

The present embodiment further includes a cutter motor 252" having an output shaft 258" with a suitable cutting tool 262" on its outer or distal end. The motor 252" is secured within a box-like cutter motor housing 264".

The structure and operation of the cutter motor 252" and all of the components associated with it are substantially the same as described above in connection with the preferred embodiment. As with the above-described preferred embodiment, the position or height of the motor 252" within the cutter motor housing 264" may be adjusted (not shown). However, unlike the above-described preferred embodiment, there is no provision in the present embodiment for varying the angle of orientation of the motor housing 264" with respect to the cutter housing 250" since as will hereinafter become apparent, the cutter motor housing 264" moves straight outwardly normal to the liner.

As best seen in FIGS. 32 and 34, secured to each of the lateral sides of the cutter motor housing 264" are cam followers, in the present embodiment two pairs of roller bearings respectively indicated as 336 and 338. As shown, a single roller bearing from each pair is secured to the cutter motor housing 264" by a suitable supporting means, for example bolts 340. As will hereinafter become apparent, the inner roller bearing 336 on each bolt (supporting shaft) 340 is provided for moving the cutter motor housing 264" radially inwardly or outwardly and the outer roller bearing 338 on each bolt 340 is provided for maintaining a constant normal orientation of the cutter motor housing 264" with respect to the cutter housing 250" as it moves radially Each of the outer roller bearings 338 are positioned within suitably sized, generally vertically extending guide slots 342 which are cut within the interior surfaces of the lateral sidewalls of the cutter housing 250". By maintaining roller bearings 338 within slots 342, the cutter motor housing 264" may only move perpendicular to the cutter housing 250". Of course, if the cutter housing 250" is oriented as shown in FIG. 31, the cutter motor housing 264" is restricted to vertical upward and downward movements. If the cutter housing 250" is rotated in the manner as described above, movement of the cutter motor housing 264" is in a radial direction perpendicular to the cutter housing 250" and to the pipe liner.

The inner roller bearings 336 on each bolt (supporting shaft) 340 are similarly employed for the actual radial movement of the cutter motor housing 264". For this purpose, the uppermost inner roller bearing 338 on each lateral side of the cutter motor housing 264" engages the camming means or forward cutter lifting subhousing sloping portion 334 as best seen in FIG. 31. Correspondingly, each of the lower inner roller bearings 338 are installed within a pair of camming means, in the present embodiment angular slots 344 which extend through each of the lateral sides of the cutter lifting subhousing 330. As shown in FIG. 31, the angle of the slots 344 corresponds to the slope angle on the cutter lifting subhousing sloped forward position 334.

In operation, to move the cutter motor housing 264" radially outwardly (upwardly when viewing FIG. 31), the forward movement of shaft 204" causes the cutter lifting subhousing 330 to slide axially forward along the cutter housing guide slots 332. The inner roller bearings 336 engage the cutter lifting subhousing slope 334 and the corresponding slots 344, causing the cutter motor housing 264" to move outwardly (upwardly) as the cutter lifting subhousing 330 moves forward. As previously described, the outer roller bearings 338 engage the cutter housing slots 342 to maintain the orientation of the cutter motor housing 264" straight upwardly so that the cutter tool 262" moves straight outwardly to engage the sewer pipe liner 22 in a generally perpendicular manner. Correspondingly, axial movement of the shaft 204" toward the rear causes the cutter lifting subhousing 330 to move in the opposite direction (towards the rear or right when viewing FIG. 31) and results in the cutter motor housing 264" moving radially inwardly (vertically downwardly) due to the camming action of the roller bearings 336 and 338.

Control Subassembly

Figure 35:
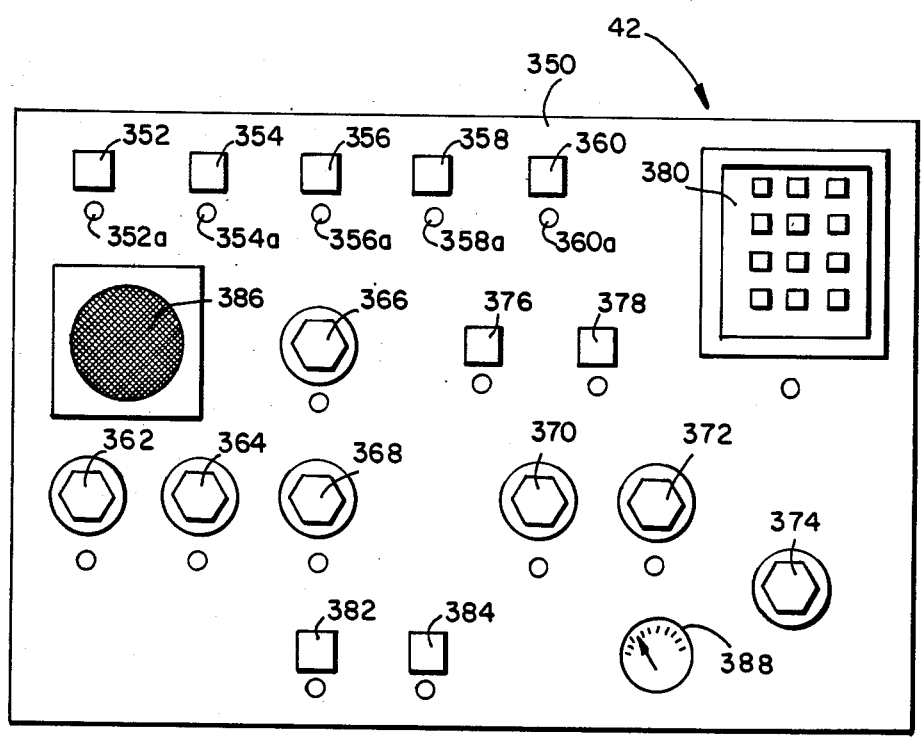
FIG. 35 is an enlarged plan view of the control panel of the apparatus of FIG. 1.

Referring now to FIG. 35, there is shown a preferred embodiment of a control panel 350 of the control subassembly 42. As shown, the control panel 350 includes switching means, in the present embodiment five push-button switches 352, 354, 356, 358 and 360 each of which includes a corresponding on/off indicator means such as indicator lights 352a, 354a, 356a, 358a and 360a. Push-button switch 352 controls the power to the control panel 350 and the remainder of the control subassembly 42. Push button switch 354 controls the power to the hydraulic pump subassembly 40. Push button switch 356 controls the power to the video camera unit 12. Push button switches 358 and 360 are employed to control the power to forward and rearward cable winches (not shown) which are employed for moving the various operational units of the cutter apparatus 10 along the sewer pipe 24.

Control switches 362 and 364 are provided for controlling the forward and reverse movement of the front and back cable winches (not shown). Again, these cable winches are employed for moving the various operational units of the cutter apparatus 10 along the sewer pipe in a manner well known in the art.

Control switches 366, 368, 370 and 372 are employed to control the operation of the various operational units within the sewer pipe 24. Switch 366 is employed to control the holder subassembly 32 for the purpose of locking the operational units in place within the sewer pipe 24 in the manner described in detail above. Switch 368 controls the inward and outward radial movement of the cutter 30 as also previously described. Switch 370 is employed for controlling the forward and rearward axial movement of the cutter 30. Correspondingly, switch 372 is employed to control the clockwise and counter-clockwise rotational movement of the cutter 30. As previously described, the cutter may be separately moved in either the axial radial or rotational directions or more than one of such movements may be simultaneously accomplished. As also previously described, switches 366, 368, 370 and 372 in actuality provide electrical signals for the actuation of the solenoid valves 90 which in turn are actuated to provide pressurized hydraulic fluid to the various above-described hydraulic hoses.

In order to provide further control of the positioning of the cutter 30 a joy stick-type control switch 374 is provided. The joy stick control switch 374 replaces the functions performed by switches 368, 370 and 372 to permit the operator to control with one motion the radial movement, axial movement and rotational movement of the cutter 30. A push button on/off switch 376 is provided to override individual control switches 368, 370 and 372 and to transfer the respective control functions of each of these three switches to the joy stick-type controller switch 374.

In addition to permitting the operator to control the movement of the cutter either individually utilizing switches 368, 370 and 372 or simultaneously using joy stick-type controller switch 374, the control subassembly 42 includes an automated system in the form of a programmed microprocessor system (not shown) which permits the cutting of the liner 22 to be automatically accomplished once the operational units of the cutter apparatus 10 are properly positioned. However, in order to permit the microprocessor system to properly control the functioning and positioning of the cutter, information must be provided regarding the size orientation etc. of the portion of the liner to be cut. For this purpose the control panel 350 includes a digital input pad 380 which is connected to the microprocessor system (not shown). A push button switch 378 is provided to activate the microprocessor system for automated cutting of the liner 22.

In order to provide the operator with additional flexibility, the control panel 350 includes two separate switch means for activating the cutter motor 252. The first switch means is a standard push button on/off switch 382 which when depressed maintains the cutter motor 252 in either its on or its off condition. The second switch means is a push and hold type switch 384 which permits the operator to "pulse" the cutter motor 252 on at will and keep the motor 252 on only as long as the switch 384 is depressed. In this manner, the operator is able to better control the cutting operation.

As previously discussed, it has been found that the operator is also better able to control the cutting operation if he or she is able to hear the cutting which is going on within the sewer pipe 24. Therefore, a suitable microphone (not shown) is provided near the rear end of the video camera unit 12 and a suitable speaker 386 is provided on the control panel 350 for this purpose. Thus, for example, if the operator begins to cut the liner 22 and notices an unusual sound it may indicate that the cutter is not properly positioned and is cutting an area of pipe rather than the open portion of the lateral. The operator may then make a suitable adjustment as required. An amp meter 388 is connected to the external power source (not shown) which provides electrical power to electric motor 54 which drives hydraulic pump 52. By observing the ampere demand the operator can keep the operational stress that is imposed upon the various units of the cutter apparatus 10 to safe limits.

From the foregoing description it can be seen that the present invention comprises a remotely controlled, hydraulically operated cutter apparatus for use within a conduit, preferably a sewer pipe. The present invention provides an alternative to the prior art cutter which is more economical and efficient to operate and which provides greatly enhanced reliability. It will be recognized by those skilled in the art that changes may be made to the above-described embodiment of the invention without departing from the broad inventive concepts thereof. It is understood, therefore, that this invention is not limited to the particular embodiment disclosed, but it is intended to cover all modifications which are within the scope and the spirit of the invention as defined by the appended claims.

I claim:

1. A remotely controlled, hydraulically operated cutter apparatus for use within a conduit comprising:
   control means located outside of the conduit for generating a plurality of electrical control signals for controlling the operation of the cutter apparatus;
   a source of pressurized hydraulic fluid;
   valve means for receiving both pressurized hydraulic fluid from the fluid source and control signals from the control means and for distributing the received hydraulic fluid in accordance with the received control signals;
   a hydraulically powered cutter motor located within the conduit and including a cutting tool, said cutter motor receiving hydraulic fluid from the valve means for driving the cutting tool;
   means for supporting the cutter motor within the conduit;
   first hydraulically actuated means for receiving hydraulic fluid from the valve means and for holding the supporting means at a fixed axial position within the conduit as long as the received hydraulic fluid exceeds a predetermined minimum;
   second hydraulically actuated means for receiving hydraulic fluid from the valve means and for adjusting the axial position of the cutter motor with respect to the supporting means in accordance with the received hydraulic fluid;
   third hydraulically actuated means for receiving hydraulic fluid from the valve means and for adjusting the radial position of the cutter motor with respect to the supporting means in accordance with the received hydraulic fluid; and fourth hydraulically actuated means for receiving hydraulic fluid from the valve means and for rotating the cutter motor up to 180 degrees about the axis of the conduit in either a clockwise or counterclockwise direction with respect to an initial position in accordance with the received hydraulic fluid, the first, second, third and fourth hydraulically actuated means cooperating to position the cutter motor to facilitate cutting by the cutting tool, the valve means comprising manifold means including an inlet port for receiving the pressurized fluid from the fluid source, an outlet port for transmitting fluid to the fluid source and a plurality of at least nine fluid transfer ports for transmitting pressurized hydraulic fluid to and receiving return hydraulic fluid from the cutter motor and the first, second, third and fourth hydraulically actuated means, a plurality of at least nine electrically operated solenoid valves for selectively directing the hydraulic fluid between the manifold means inlet and outlet ports and the manifold means transfer ports in accordance with the received control signals, at least nine flexible hydraulic hoses, a first end of each hose being connected to one of the manifold means fluid transfer ports and the second end of each hose being connected to one of the cutter motor or the first, second, third or fourth hydraulically actuated means, and means for maintaining the nine hydraulic hoses in an untangled condition while facilitating the movement of one or more of the hydraulic hoses to accommodate for axial or radial adjustments in the position of the cutter motor and for the rotation of the cutter motor, the means for maintaining the nine hydraulic hoses comprising an elongated hydraulic hose control housing positioned within the conduit, the housing being generally U-shaped in cross section and including a pair of guide grooves extending generally parallel to the axis of the conduit and a slide member supported by the guide grooves for movement along the axis of the conduit with respect to the housing in correspondence with axial movement of the cutter motor, the hydraulic hoses having second ends which are connected to the cutter motor and the third and fourth hydraulically actuated means being six in number and being secured to said slide member for movement therewith, said six hydraulic hoses including expansion loops to permit axial movement of the six hydraulic hoses for a predetermined distance to compensate for axial movement of the cutter motor without substantial stressing or stretching of the six hoses.

2. The apparatus as recited in claim 1 wherein the slide member includes a pair of slots extending generally parallel to the axis of the conduit and a pair of keeper members, one of which is supported in each of the slots for independent axial movement therein, the hydraulic hoses having second ends which are connected to the cutter motor being two in number and being secured to said keeper members for axial movement therewith when the cutter motor is rotated to permit axial movement of said two hydraulic hoses to compensate for rotation of the cutter motor without substantial stressing or stretching of the two hydraulic hoses.

3. The apparatus as recited in claim 2 wherein the slide member further includes biasing means within each of the slide member slots to urge the keeper members toward a predetermined substantially central position along the slots when the cutter motor is in the initial position.

4. The apparatus as recited in claim 3 wherein the biasing means comprises a pair of coil springs.

5. A remotely controlled, hydraulically operated cutter apparatus for use within a conduit comprising:

control means located outside of the conduit for generating a plurality of control signals for controlling the operation of the cutter apparatus;

a source of pressurized hydraulic fluid;

valve means for receiving both pressurized hydraulic fluid from the fluid source and control signals from the control means and for distributing the received hydraulic fluid in accordance with the received control signals;

a hydraulically powered cutter motor located within the conduit and including a cutting tool, said cutter motor receiving hydraulic fluid from the valve reans for driving the cutting tool;

means for supporting the cutter motor within the conduit, the means for supporting the cutter motor comprising a holder housing including a pair of guide slots extending generally parallel to the axis of the conduit, a cutter position adjusting housing supported by the holder housing and disposed for axial movement along the holder housing guide slots, and a cutter housing supported by the cutter position adjusting housing for supporting the cutter motor;

first hydraulically actuated means for receiving hydraulic fluid from the valve means and for holding the supporting means at a fixed axial position within the conduit as long as the received hydraulic fluid exceeds a predetermined minimum;

second hydraulically actuated means for receiving hydraulic fluid from the valve means and for adjusting the axial position of the cutter motor with respect to the supporting means in accordance with the received hydraulic fluid;

third hydraulically actuated means for receiving hydraulic fluid from the valve means and for adjusting the radial position of the cutter motor with respect to the supporting means in accordance with the received hydraulic fluid, the third hydraulically actuated means comprising a hydraulic cylinder secured to the cutter position adjusting housing, the hydraulic cylinder including a piston and piston rod adapted for translation upon the receipt of hydraulic fluid from the valve means, and linking means within the cutter housing for interconnecting the hydraulic cylinder piston rod and the cutter motor and for moving the cutter motor radially inwardly and outwardly in accordance with the translation of said piston rod, the linking means comprising a cutter motor housing for supporting the cutter motor, the cutter motor housing including cam followers, and a lifting subhousing disposed within the cutter housing and attached to the hydraulic cylinder piston rod for translation therewith, the lifting subhousing including a camming means for engagement by the cam followers for radial inward and outward movement of the cutter motor housing in response to the translation of the lifting subhousing; and fourth hydraulically actuated means for receiving hydraulic fluid from the valve means and for rotating the cutter motor up to 180 degrees about the axis of the conduit in either a clockwise or counterclockwise direction with respect to an initial position in accordance with the received hydraulic fluid, the first, second, third and fourth hydraulically actuated means cooperating to position the cutter motor to facilitate cutting by the cutting tool.

6. The apparatus as recited in claim 5 wherein the cam followers comprise roller bearings.

7. The apparatus as recited in claim 6 wherein the camming means comprises angularly oriented slots extending through the lifting subhousing.

8. A remotely controlled, hydraulically operated cutter apparatus for use within a conduit comprising:
control means located outside of the conduit for generating a plurality of control signals for controlling the operation of the cutter apparatus;
a source of pressurized hydraulic fluid;
valve means for receiving both pressurized hydraulic fluid from the fluid source and control signals from the control means and for distributing the received hydraulic fluid in accordance with the received control signals;
a hydraulically powered cutter motor located within the conduit and including a cutting tool, said cutter motor receiving hydraulic fluid from the valve means for driving the cutting tool;
means for supporting the cutter motor within the conduit, the means for supporting the cutter motor comprising a holder housing including a pair of guide slots extending generally parallel to the axis of the conduit, a cutter position adjusting housing supported by the holder housing and disposed for axial movement along the holder housing guide slots, and a cutter housing supported by the cutter position adjusting housing for supporting the cutter motor;
first hydraulically actuated means for receiving hydraulic fluid from the valve means and for holding the supporting means at a fixed axial position within the conduit as long as the received hydraulic fluid exceeds a predetermined minimum;
second hydraulically actuated means for receiving hydraulic fluid from the valve means and for adjusting the axial position of the cutter motor with respect to the supporting means in accordance with the received hydraulic fluid;
third hydraulically actuated means for receiving hydraulic fluid from the valve means and for adjusting the radial position of the cutter motor with respect to the supporting means in accordance with the received hydraulic fluid; and
fourth hydraulically actuated means for receiving hydraulic fluid from the valve means and for rotating the cutter motor up to 180 degrees about the axis of the conduit in either a clockwise or counterclockwise direction with respect to an initial position in accordance with the received hydraulic fluid, the first, second, third and fourth hydraulically actuated means cooperating to position the cutter motor to facilitate cutting by the cutting tool, the fourth hydraulically actuated means comprising a hydraulic cylibder secured to the cutter position adjusting housing, the hydraulic cylinder including a piston and piston rod adapted for translation upon the receipt of hydraulic fluid from the valve means and means for converting the translational movement of the hydraulic cylinder piston rod into rotational movement, the converting means comprising a first cylindrical member attached to the hydraulic cylinder piston rod for translation therewith, the first cylindrical member having at least one lug extending radially therefrom and a second cylindrical member secured to the cutter housing and concentric with at least a portion of the first cylindrical member, the second cylindrical member supported for rotation within the cutter position adjusting housing, and having at least one helical slot therein, the lug on the first cylindrical member engaging the helical slot for causing the second cylindrical member and the cutter housing to rotate in response to the translation of the first cylindrical member.

9. The apparatus as recited in claim 8 wherein the second cylindrical member has an inside diameter which is greater than the outside diameter of the first cylindrical member and is supported within the cutter position adjusting housing by roller bearings, the lug on the first cylindrical member extending radially outwardly.

10. The apparatus as recited in claim 9 wherein translation of the fourth hydraulic cylinder piston rod in a first direction causes the second cylindrical member and the cutter housing to rotate in a first direction and translation of the fourth hydraulic cylinder piston rod in a second direction causes the second cylindrical member and the cutter housing to rotate in the opposite direction.

* * * * *